US008874749B1

(12) United States Patent  
Vittal et al.

(10) Patent No.: US 8,874,749 B1  
(45) Date of Patent: Oct. 28, 2014

(54) NETWORK FRAGMENTATION AND VIRTUAL MACHINE MIGRATION IN A SCALABLE CLOUD COMPUTING ENVIRONMENT

(75) Inventors: Chiradeep Vittal, Cupertino, CA (US); Will Chan, Santa Clara, CA (US); Alex Huang, Cupertino, CA (US); Sheng Liang, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 262 days.

(21) Appl. No.: 13/020,802

(22) Filed: Feb. 3, 2011

Related U.S. Application Data

(60) Provisional application No. 61/301,168, filed on Feb. 3, 2010.

(51) Int. Cl.  
*G06F 15/173* (2006.01)

(52) U.S. Cl.  
USPC .......................................................... 709/226

(58) Field of Classification Search  
USPC ........................... 709/234, 226, 224, 223, 225  
See application file for complete search history.

(56) References Cited

U.S. PATENT DOCUMENTS

| | | | |
|---|---|---|---|
| 2007/0266433 A1* | 11/2007 | Moore | 726/15 |
| 2009/0222558 A1 | 9/2009 | Xu et al. | |
| 2009/0248896 A1* | 10/2009 | Cohn | 709/245 |
| 2009/0276771 A1 | 11/2009 | Nickolov et al. | |
| 2009/0282404 A1* | 11/2009 | Khandekar et al. | 718/1 |
| 2009/0300605 A1* | 12/2009 | Edwards et al. | 718/1 |
| 2010/0260187 A1* | 10/2010 | Ongole et al. | 370/395.53 |
| 2011/0022812 A1* | 1/2011 | van der Linden et al. | 711/163 |

\* cited by examiner

*Primary Examiner* — Vivek Srivastava  
*Assistant Examiner* — Normin Abedin  
(74) *Attorney, Agent, or Firm* — BainwoodHuang

(57) ABSTRACT

A scalable cloud infrastructure serves two or more customers, where each customer is associated with at least one unit of virtual resources. The virtual resources are established by apportioning physical resources in the cloud infrastructure that are partitioned into pods within one or more zones in a scalable manner. Additionally, the cloud infrastructure establishes one or more management server clusters each comprising one or more management servers. The two or more customers create a number of virtual machines within pods in a zone. Due to the scalability of the cloud infrastructure, customer virtual machines may exist in non optimal locations within the zone. A method to migrate virtual machines and defragment customer networks is devised to optimally manage network traffic and data communication in a scaled cloud infrastructure.

18 Claims, 16 Drawing Sheets

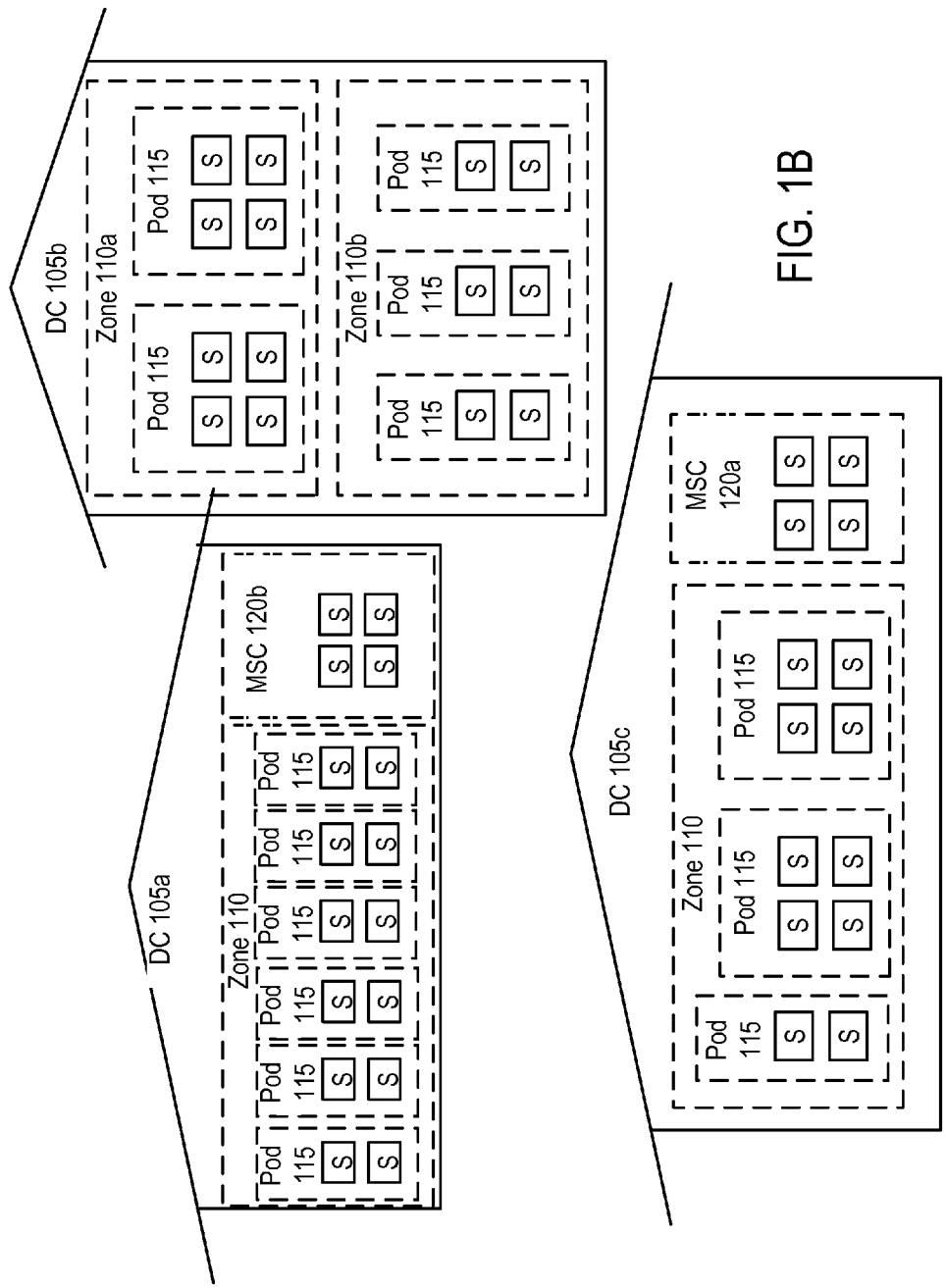

NETWORK FRAGMENTATION AND VIRTUAL MACHINE MIGRATION IN A SCALABLE CLOUD COMPUTING ENVIRONMENT

CROSS REFERENCE TO OTHER APPLICATIONS

This application claims the benefit, under 35 U.S.C. §119 (e), of U.S. Patent Application No. 61/301,168, filed on Feb. 3, 2010, and incorporated by reference herein.

BACKGROUND

This disclosure generally relates to cloud computing, and, more particularly, to enabling infrastructure information technology services, including computing, storage, and networking services to be provisioned on demand and delivered over the Internet in a scalable manner.

Service providers and enterprises have traditionally relied on large local installations of commodity data center hardware, including computing, storage, and networking devices, to provide information technology services and applications to their users. The advent of computing services that enable applications to run in "the cloud," or on remote data centers that provision computing, storage, and networking services to applications, has left many service providers and enterprises with a large inventory of unused commodity data center hardware.

A cloud infrastructure provides on-demand computing resources to a customer (whether an individual or an enterprise) of the cloud operator through virtualization. The customer typically is physically remote from the computing resource and is agnostic to the location of the physical resources that support the computing resources. In a virtualized cloud infrastructure, the computing resource generally comprises a virtual machine characterized by some amount of processor, memory, storage, networking capability or capacity. Virtualization allows the physical resources support a large number of computing resources, often well beyond the limited number of actual physical devices. Physical resources in the cloud infrastructure are shared amongst the different customers of the cloud infrastructure. Each customer gets the illusion of operating a physically distinct computing resource.

Traditional virtualization infrastructure is built on shared storage and shared Layer-2 (Data Link) networking. These requirements severely limit scalability of conventional cloud systems. In shared storage, the physical disks may be physically separate from the computing server. These disks are typically controlled by a dedicated computer known as a storage controller or storage server. The storage controller provides access to the physical server via network protocols such as NFS and iSCSI. The virtual machines therefore access their storage over the network, but in a transparent fashion such that their storage appears to be locally attached. Each storage server provides storage to multiple physical servers. The virtual machines access their virtual disks over the network via a hypervisor deployed on the physical servers hosting the virtual machines. The hypervisor is responsible for managing the virtual machines' access to the storage servers.

When the storage is networked in such a fashion, it may provide many advantages to the cloud operator. However, a typical infrastructure cloud is characterized by massive scale with hundreds or thousands of customers operating thousands of virtual machines simultaneously, with each customer getting the illusion of operating physically distinct computers. To support such scale, the operator needs to deploy hundreds of physical servers and the networking elements and storage to support these physical servers.

While advantageous as outlined above, commercially available storage servers are not the ideal solution. The storage servers may not scale sufficiently to support such deployments due to architectural limitations. They may be prohibitively expensive or represent more capital outlay than warranted by the initial anticipated demand for the service. They may present single points of failure or increased cost due to deployment of redundant elements. Insurmountable performance bottlenecks may be present, for example, due to the limits of networking speed. Expensive large centralized storage may require long-term technology and vendor lock-in detrimental to the competitiveness of the cloud operator.

The networking elements may provide a similar challenge in large scale cloud deployments. Typically the network between the physical servers is provided by switched Ethernet since it provides performance at optimal price points. However, interconnecting all physical servers using Layer-2 switching has a number of drawbacks.

First, each physical server uses broadcasts and multicasts to discover services and advertise services on the network. As the number of physical servers increases to accommodate a growing number of virtual machines, the amount of broadcast traffic scales accordingly. Broadcast traffic is detrimental to the performance of the network since each server is interrupted by every broadcast even if it is not relevant to the server. Commercially available network switches can often only support a few dozen physical ports—each physical server is connected to one or more ports. Switches can be linked together with high speed switches but at great expense and potentially lower reliability.

Additionally, previous virtualization technologies resorted to one of two approaches: physical host-based network virtualization using software drivers integrated in the hypervisor or physical network/VLAN-based network virtualization, either via port-based VLANs or IEEE 802.1q tagged Ethernet frames. The popular IEEE 802.1Q standard defines a 12-bit tag, which allows more than 4000 VLANs to be supported within a broadcast domain. But neither of these approaches by themselves are sufficient to build a scalable cloud infrastructure.

SUMMARY

In a cloud infrastructure, physical resources are partitioned into pods within one or more zones in a scalable manner. The physical resources comprise physical compute, storage, and networking resources within data centers distributed across a network. Each zone comprises a subset of the pods and is physically isolated from other zones in the plurality. Each pod comprises a discrete set of physical resources in a zone, which resources are tightly connected via a communications network. The physical resources across pods are weakly connected via a communications network, in contrast to the physical resources within pods. Additionally, the cloud infrastructure establishes one or more management server clusters each comprising one or more management servers. In one embodiment, resources are strongly connected by physical and data link level protocols, and weakly connected by network or higher level protocols. In another embodiment, resources are strongly connected by having relatively low latency and/or high bandwidth network links between them, and weakly connected by having high latency and/or low bandwidth network link between them.

The cloud infrastructure serves two or more customers with authenticated accounts. Each customer is associated with units of virtual resources on the cloud infrastructure. The cloud infrastructure establishes units of virtual resources by apportioning selected sets of the physical resources within the pods. The apportioned physical resources may be shared between two or more of the units of virtual resources. Each management server is configured for allocating the units of virtual resources to an account associated with each customer.

The cloud infrastructure comprises one or more data networks built from the distributed networking resources. A data network connects the pods and is configured for routing traffic to the pods from the customers of the cloud infrastructure and vice versa. The cloud infrastructure also comprises establishing one or more management networks. A management network connects the management servers to one of the zones, and connects the compute and storage resources partitioned within the pod.

The scalability of the pod architecture leads to several technical challenges, one of which is the fragmentation of customer virtual machines across a number of pods within a zone. While the architecture itself is designed to network any set of virtual machines within the zone, efficiency of network traffic is degraded as packets for customer virtual machines in separate pods are routed throughout the zone. To address this issue, fragmented customer accounts are migrated to and from computing servers within and between pods.

In one embodiment, a customer's virtual machines are first consolidated on a computing server within a pod, and then to a set of computing servers within pod if allocated resources are greater than one computing server's capability. The benefits are twofold, a customer has the ability to launch a virtual machine within the zone on demand even if their primary computing resource is full; and the launched virtual machine is eventually consolidated with existing customer virtual machines for maximum efficiency within the customer's virtual network.

Migration also allows administrators to take down physical servers within pods or entire pods themselves, thus affording the pod architecture exceptional physical resource management independent of scale. In one embodiment, an administrator configures a management server to migrate virtual machines on a computing server, pod, or number of either, to resources staying online. While taking down servers and pods may lead to fragmentation, customer virtual machines still operate within the architecture. The customer networks are then defragmented or migrated back to their previous location after the computing servers or pods are replaced to restore network efficiency.

Migration also has to be unobtrusive to the customer account from both a network and computing perspective. Pod architecture solves the former fundamentally with its network architecture. The hypervisor solves the latter. Hypervisors are instructed to prepare for virtual machine migration and create a virtual NIC for the customer (if needed) to see their network traffic. Hypervisors migrate and receive migrating virtual machines complete with memory and processing counters to prevent computing discontinuity. Additionally, customer network traffic for the migrating virtual machine is received at the destination via the customer's virtual NIC. The result is the "live migration" of running virtual machines between computing servers.

Accordingly, live migration allows the defragmentation of customer networks to facilitate network and computing efficiency with minimal customer computing interruptions.

In one aspect, there is provided a computer implemented method for migrating a virtual machine across a set of pods, where each pod has a discrete set of physical resources. A set of physical computer, storage, and network resources are allocated to the virtual machine within a first pod. Then it is determined whether a corresponding set of physical compute, storage, and network resources are available in a second pod, having its own set of physical resources. Where the set of corresponding physical resources are available in the second pod, the virtual machine is relocated from the first pod to the second pod by allocating the set of corresponding physical resources in the second pod to the virtual machine and releasing the set of physical compute, storage, and network resources within the first pod.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 1A-1C provide one embodiment of a collective conceptual framework for a scalable cloud infrastructure.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Reference will now be made in detail to several embodiments of the present invention(s), examples of which are illustrated in the accompanying figures. It is noted that wherever practicable similar or like reference numbers may be used in the figures and may indicate similar or like functionality.

Figure 1A:
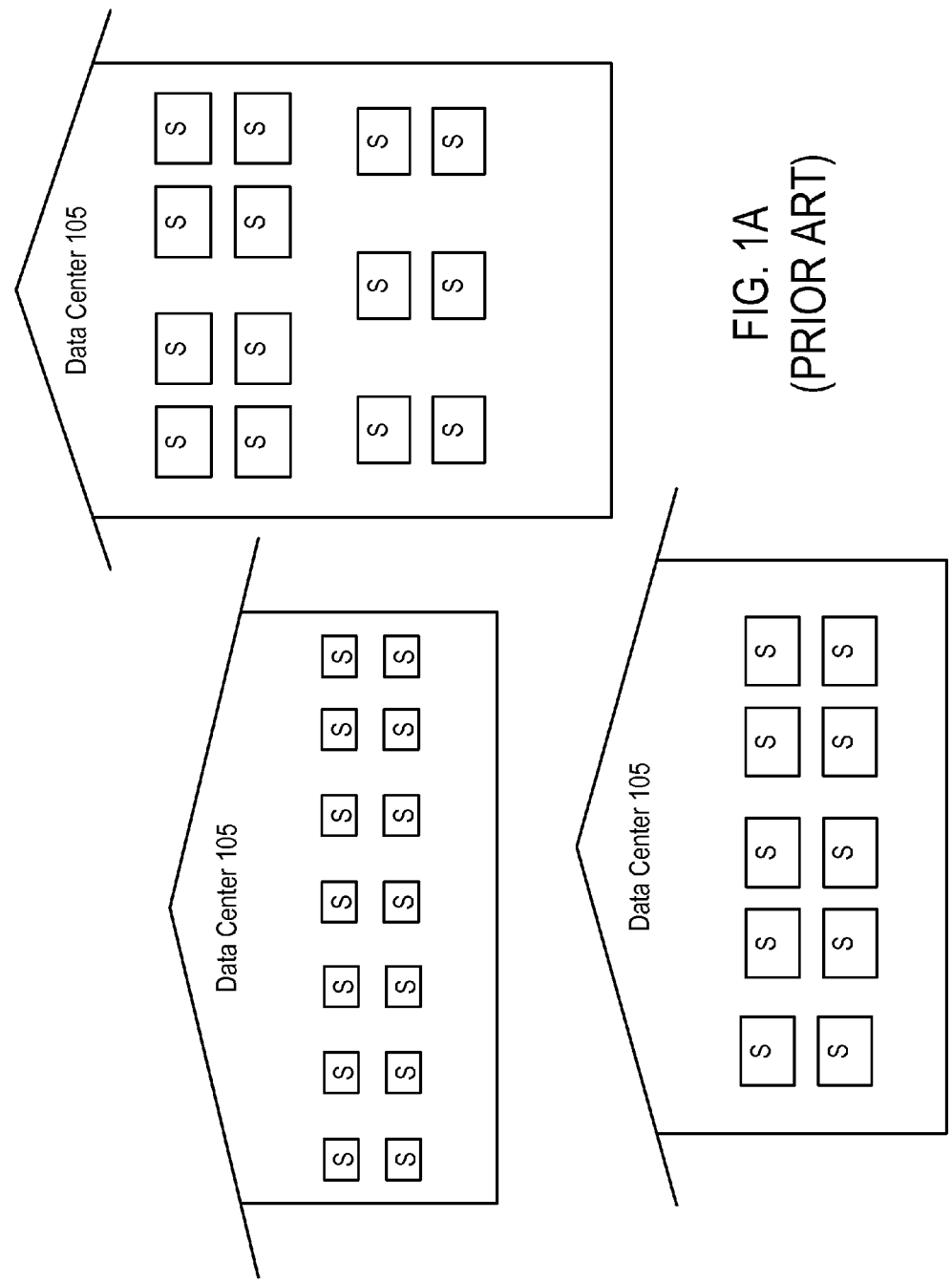

FIG. 1A shows three separate data centers 105, each housing a number of servers S. A server S is a computer system based upon any type of hardware, including for example low-cost commodity data center hardware: x86 servers connected together using gigabit Ethernet. Service providers and enterprises have traditionally relied upon large local installations of this type of commodity data center hardware, including computing, storage, and networking devices, to provide information technology services and applications to their customers. Currently there is a large inventory of unused data center hardware in the market.

Figure 1C:
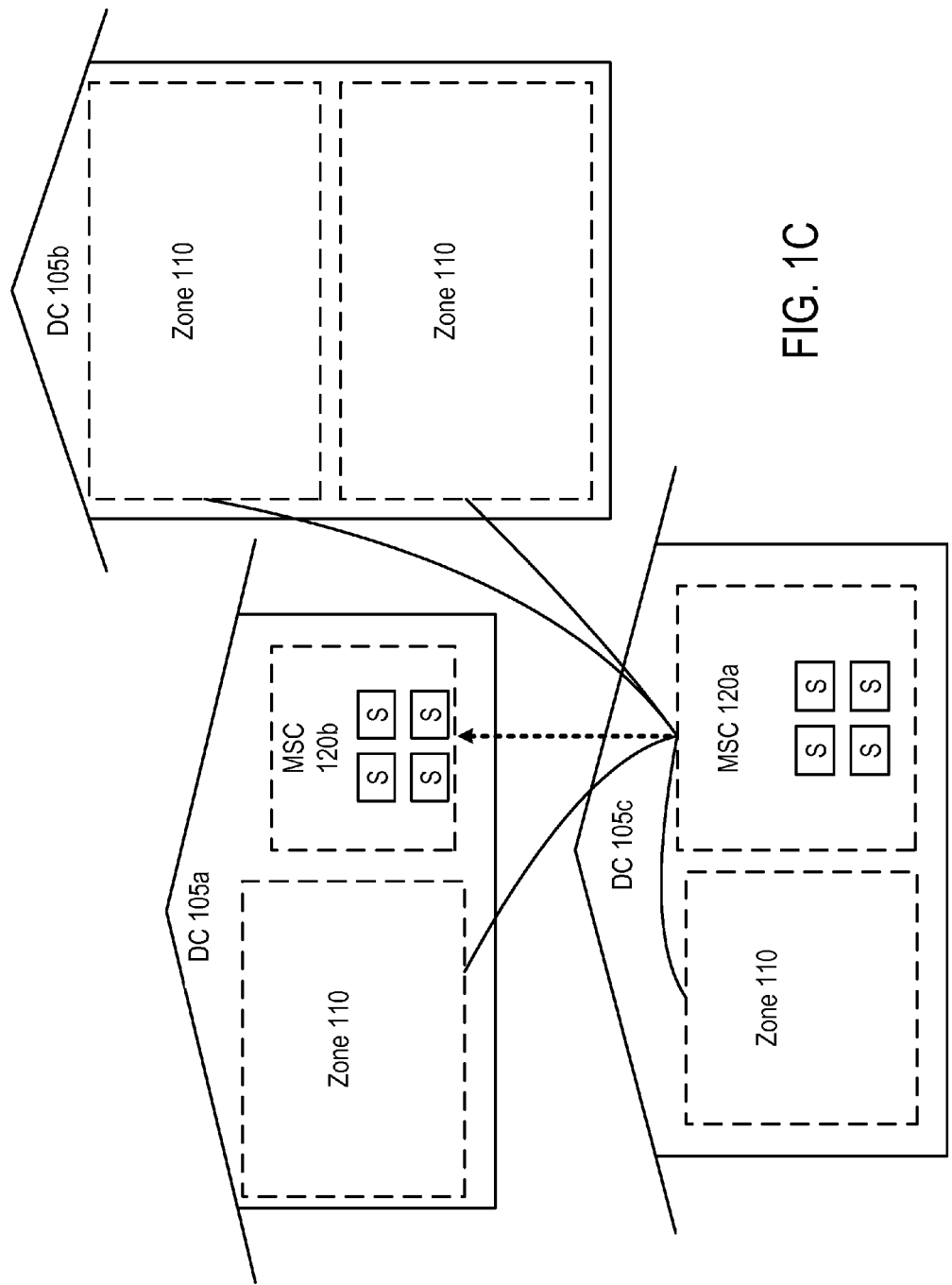

The present invention improves the organization and utilization of data center hardware to provide a scalable cloud infrastructure, by building a system of small blocks within data centers, and connecting the physical servers across data centers using high speed networks. FIGS. 1B-1C illustrate the overall framework for the scalable cloud infrastructure.

FIG. 1B shows several data centers ("DC") 105 and servers S partitioned into groupings of zones 110, pods 115 and management server clusters (MSC) 120. Each zone 110 is physically isolated from each other zone 110. Typically each data center 105 includes only one zone 110, however, a data center 105 can include multiple zones 110, e.g., as shown in data center 105b. When two zones such as 110a, 110b are not geographically distributed, they may still be physically isolated, e.g., via use of a separate power supplies, network uplinks, and other supporting infrastructure. Each zone 110 includes a grouping of pods 115.

Each pod 115 is a self-contained, physical grouping of servers that acts as a management unit for the scalable cloud infrastructure. Each pod 115 includes a discrete (i.e., non-overlapping) set of the physical resources in the zone 110. The physical resources in each pod have strong connectivity with each other and weak connectivity with the physical resources outside the pod. The strong connectivity and weak connectivity refer to the latency for traffic between connected physical resources. The latency for traffic may be determined by many different factors.

In one embodiment, strong connectivity and weak connectivity may be switching of traffic between any two connected physical resources on a particular layer of a standard, for instance the OSI model. As an example, strong connectivity may imply Layer-2 switching. Similarly, weak connectivity may imply layer-3 or higher layer switching. In another embodiment, strong connectivity and weak connectivity may be based on the bandwidth available for traffic between the connected physical resources. As an example, strong connectivity may be implemented by provisioning a minimum of 10 GHz links between the connected physical resources. Similarly, weak connectivity may be implemented by a minimum of 1 GHz links between the connected physical resources. Additionally, geographic proximity may also be used to define strong connectivity and weak connectivity. It is possible that geographically distant physical resources have a higher latency for traffic than geographically closer physical resources.

The discrete set of physical resources in a pod 115 may be based on the anticipated processor, memory, network, and storage requirements of potential customers of resources within a zone 110. For example, a customer's storage and network requirements can be significant. Given a specification of resources, e.g., an average and peak throughput in terms of input-output operations per second (IOPS), and assuming that that throughput is to be divided equally amongst the devices (e.g., virtual machines) in a pod 115, then the IOPS capacity of the servers determines an overall total number of virtual machines for a pod 115. If each server within the pod 115 can host a specified number of virtual machines, then a pod 115 could be sized accordingly in terms of the number of servers, storage, and networking requirements.

The pods 115 can be coupled with any number of other pods 115 using Layer-3 switching, thereby enabling unlimited scaling of the number of customers using the scalable cloud infrastructure. The pods 115 allow the scalable cloud infrastructure to be built from smaller units of management, and without a large up-front hardware investment.

FIG. 1B also shows one or more management server clusters (MSC) 120 to the data centers 105 housing the zones 110. The management server cluster 120 is a cluster of front-end servers S and their associated backend storage. The servers that make up the management server cluster 120 allocate and manage use of the physical resources in the associated zones 110 by one or more customer accounts associated with units of virtual resources as shown in FIG. 1C and further described below. A virtual machine is characterized by a combination of the units of virtual resources for processor, memory, storage and networking. In brief, units of virtual resources are established by apportioning selected physical resources within the pods 115 and zones 110; the physical resources may be shared between units of virtual resources (i.e., may overlap).

Typically the management server cluster 120 is deployed as a primary management server cluster 120a in a first datacenter 105a, with a back up management server cluster 120b installation at a second datacenter 105c.

In one embodiment, data stored by the first management cluster 120a is replicated and transmitted for storage by the second management cluster 120b. In response to a failure of the first management cluster 120a, the domain name system (DNS) records are updated in the servers in the zones 110 such that network traffic that would normally be directed to the first management server cluster 120a instead is directed to the second management server cluster 120b. Thus, operation of the servers in the zones 110 is unaffected by failure of the first management server cluster 120a. The two management server clusters 120 are isolated from one another by residing in different data centers 105a, 105c to minimize the likelihood of simultaneous failure of the management server clusters 120.

It is within the architectural framework of FIGS. 1B-1C that the scalable cloud infrastructure is further described herein.

Figure 2:
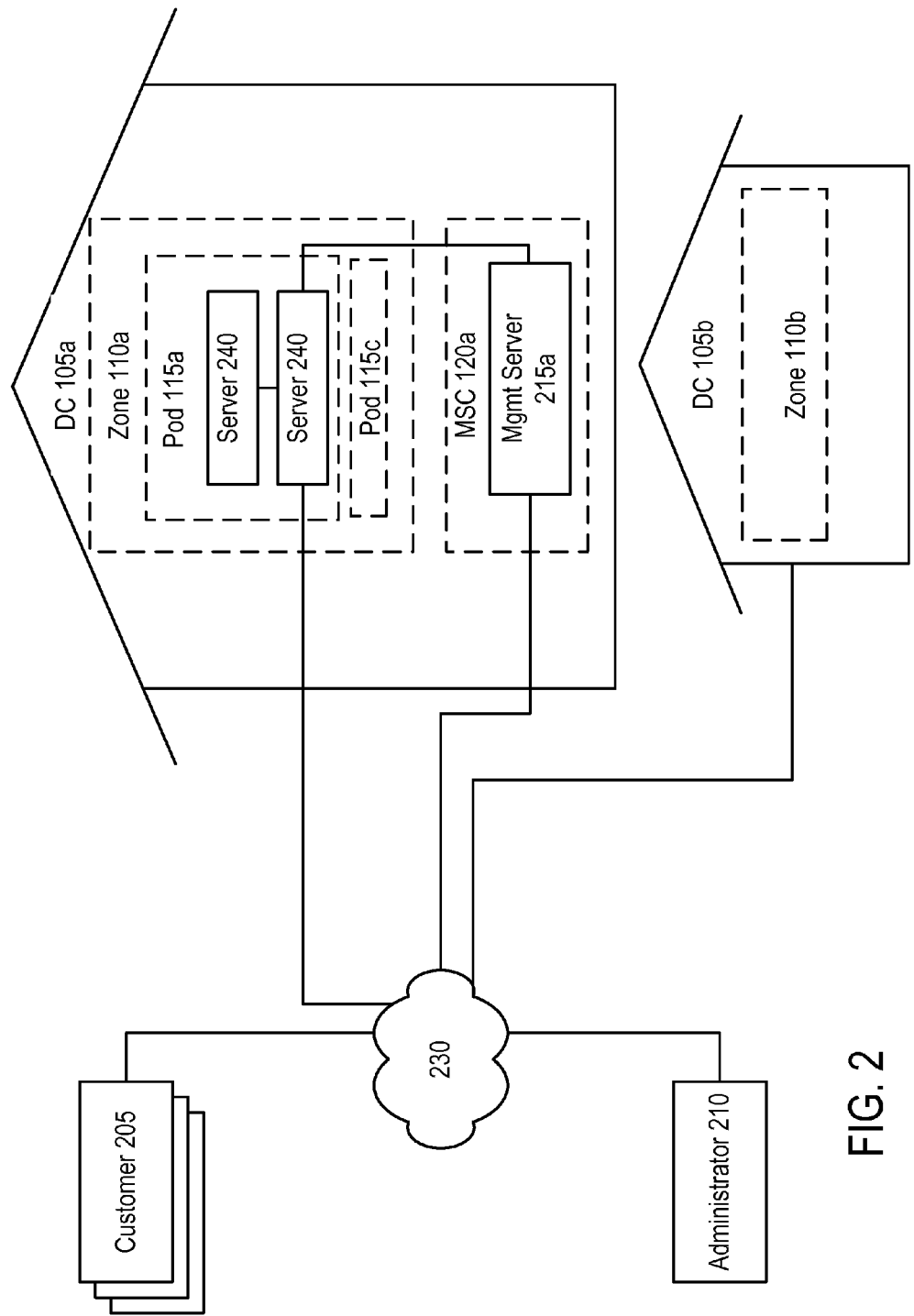
FIG. 2 is one embodiment of a high-level entity diagram for a scalable cloud infrastructure.

FIG. 2 is a high-level entity diagram for one embodiment of a scalable cloud infrastructure. The entities included are one or more customers 205, an administrator 210, one or more management server clusters 120 and servers 240, which are physical resources within zones 110 in data centers 105, connected to a network 230. The data center 105 are partitioned into a plurality of zones 110, and each zone contains one or more pods 115, as described above. Each zone 110 is connected to a management server 215 in the management server cluster 120 and to the network 230. The network 230 is the Internet according to one embodiment, but may be any other network, including but not limited to any combination of a LAN, a WAN, a MAN, a mobile, a wired or wireless network, a private network, or a virtual private network, where Layer 2 and Layer 3 switching is required.

The administrator 210, or operator of the cloud infrastructure, deploys the various resources as discussed above. In one embodiment, the operator of the cloud infrastructure is distinct from one or more providers of the resources, e.g., a provider may own any number of virtual machines that will be used by the administrator 210 in the cloud infrastructure. In one embodiment, the provider owns a large number of servers 240.

One or more customers 205 are users of portions of the resources of the cloud infrastructure. The term customer may refer to either the device or the user (entity or person). Customers 205 access the resources associated with their respective customer accounts and are connected to the resources via the network 230. Details of customer 205 account resource allocation and access to those resources are discussed further in conjunction with FIGS. 8 and 9.

The management server cluster 120 is a cluster of management servers 215 and their associated database 220. As indicated in conjunction with FIG. 1C, the management server cluster 120 serves multiple zones 110 and pods 115 within data centers 105. The management server cluster 120 also maintains customer account information. For example, the management server cluster 120 may establish virtual machines, units of virtual resources, by apportioning the physical resources within the pods to each of the units. The physical resources may be shared between two or more of the virtual machines. Although one management server cluster 120 is depicted, multiple management server clusters 120 may be distributed throughout the cloud infrastructure, each serving a plurality of data centers 105 and zones 110. The details of the management server cluster 120 are described further in conjunction with FIG. 6.

Each management server 215 allocates and manages use of the physical resources within one or more zones 110. For example, management server 215a manages the resources in zone 110a, management server 215b manages the resources in zone 110b, and management server 215c manages the resources in zone 110c. A management network may connect each of the management servers 215 to a zone 110, and may also connect the physical resources within the pod 115. A management server 215 can allocate to, and manage, units of virtual resources associating customer accounts with the physical resources in a zone 110 associated with that management server 215. The details of the management server 215 are described further in conjunction with FIG. 7. The database 220 can be any database commonly used for storage. According to one embodiment, the database 220 is a MySQL database.

The data centers 105, zones 110, and pods 115 were described briefly in conjunction with FIG. 1B-1C. Switching within the zones 110 typically is Layer 3 switching, while switching within the pods 115 typically is Layer 2 switching, providing unlimited scaling of the cloud infrastructure. Zones 110 are described in greater detail in conjunction with FIG. 3, pods 115 are described in greater detail in conjunction with FIG. 4, and the servers in each pod 115 are described further in conjunction with FIG. 5

Figure 3:
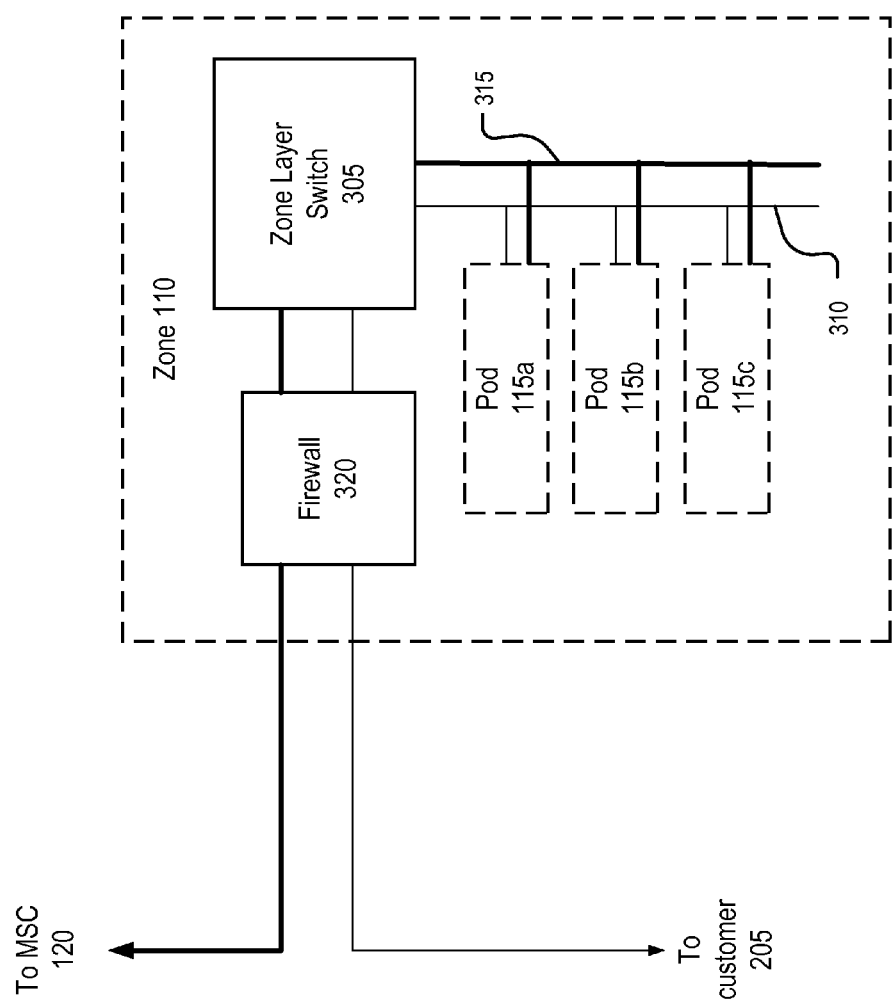
FIG. 3 depicts one embodiment of a zone 110.

FIG. 3 depicts one embodiment of a zone 110. As discussed above, a zone 110 is a grouping of physical devices, including a grouping of pods 115, that is physically isolated from other zones 110. Devices within a zone 110 utilize a one or more power supplies and/or network uplink(s) that are dedicated solely to the zone 110. The zone 110 includes a zone layer switch 305 that process traffic in and out of the zone 110 over a data network 310 and a management network 315. The zone 110 is separated from other devices on the network 230 by a firewall 320.

The zone layer switch 305 manages the network traffic to and from the pods 115 within the zone 110 and comprises one or more Layer 3 ("L3") (i.e., network layer) switches. For a zone 110 comprising the servers in a small data center 105, a pair of L3 switches may suffice. For large data centers, high-end core switches may implement core routing capabilities and include line cards that support firewall capabilities. A router redundancy protocol like VRRP also may be deployed. Traffic within the zone 110 (and/or pods 115) also is switched at other levels of either the OSI model or other networking models, as described further below.

One embodiment of the zone layer switch 305 supports two internal networks within the zone 110: a data network 310 and a management network 315. The data network 310 is used to carry traffic to and from the zone 110 from customers 205 and other entities on the network 230. For example, operation of virtual machines implemented on the servers within the pods 115 of the zone 110, e.g., if a virtual machine within the zone 110 issues an HTTP request over the network 230, both the HTTP request and any associated HTTP response will be routed via the data network 310.

The management network 315 is used to carry traffic to and from the zone 110 from the management server cluster 120 (and individual management servers 215 within the management server cluster 120), as well as traffic generated internally within the zone 110. Each pod 115 in the zone 110 is communicatively coupled to both the data network 310 and the management network 315.

All traffic in and out of the zone 110 passes through a firewall 320. The firewall 320 may comprise one or more network firewalls specific to each internal network 310, 315. The firewall 320 provides connection to the public network space (i.e., network 230) and is configured in routing mode.

In one embodiment, the firewall 320 operates in a transparent mode for the data network 310 such that the data network 310 comprises the same IP address space as the public Internet. For example, if the data network 310 utilizes public IP addresses, the zone 110 is assigned a unique set of IP addresses that do not overlap with the IP addresses assigned to other zones 110.

In one embodiment, the firewall 320 operates in a network address translation (NAT) mode for the management network 315. For example, the zone 110 can be assigned an IP address in the 192.168.0.0/16 Class B private address space, and each pod 115 within the zone 110 can be assigned an IP address in the 192.168.*.0/24 Class C private address space; the firewall 320 remaps between the two address spaces as data is sent to or from the pods 115 within the zone 110. Hence, it is possible for the pods 115 of different zones 110 to have overlapping or identical private IP addresses. In some embodiments, the firewall 320 is outside of the zone 110 such that it filters traffic to both the zone 110 and the management server cluster 120. In some embodiments, the firewall 320 enables site-to-site VPN such that servers in different zones 110 can reach each other within a virtual private network.

Figure 4:
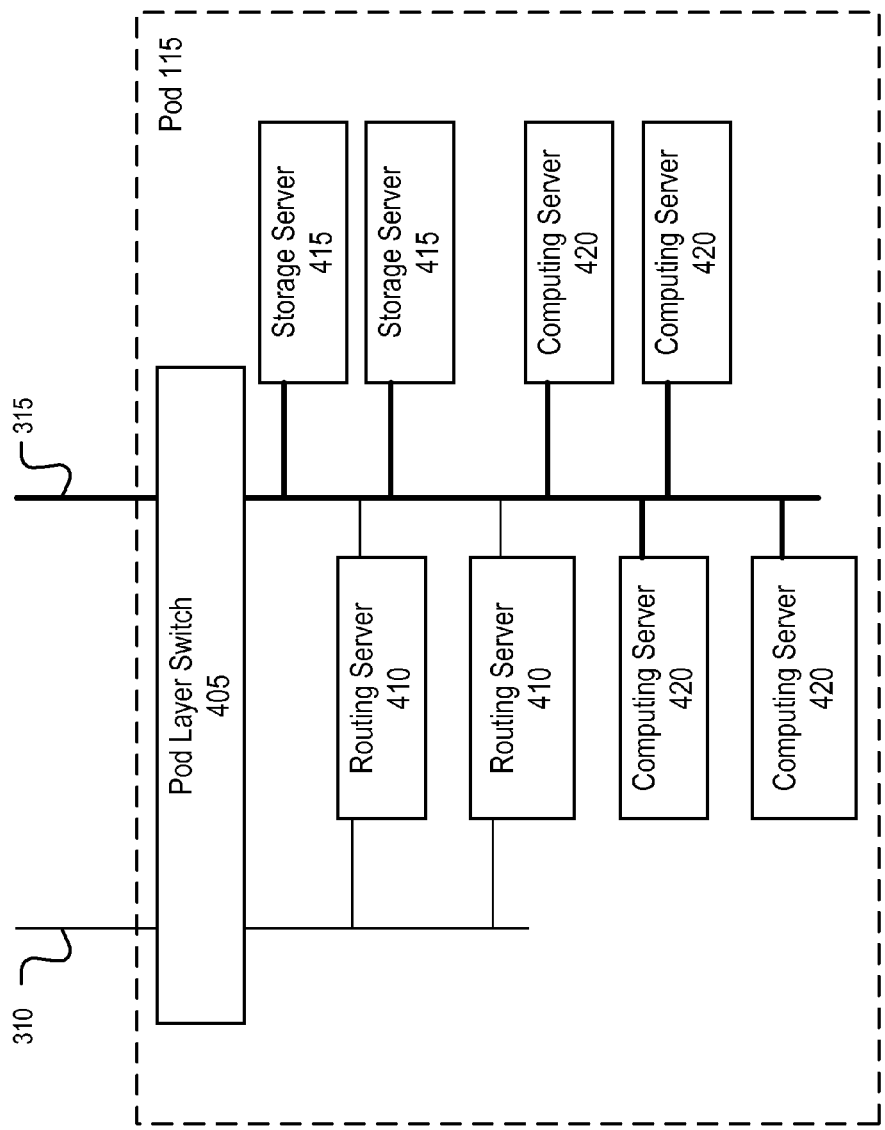
FIG. 4 illustrates one embodiment of a pod 115.

FIG. 4 illustrates one embodiment of a pod 115. The pod 115, as described above comprises a discrete set of the plurality of physical resources in the zone 110. The servers in a pod 115 typically comprise one or more each of routing servers 410, storage servers 415, and computing servers 420. In one embodiment, distinct routing servers 410 and computing servers 420 are used, whereas in another embodiment (not shown), they are one and the same and provide both functionalities described below. Traffic on the management network 310 and data network 315 in and out of the pod 115 is switched by one or more pod layer switches 405. The servers in a pod, both individually and collectively are implemented by one or more computer systems.

The routing servers 410 are configured primarily to provide networking for computer data by the inclusion of suitable networking hardware (network interfaces, networking ports, and the like). The routing servers 410 can be implemented using any manner of suitable networking hardware and software, and in some instances are combined with computing servers 420.

The storage servers 415 are implemented as any device or combination of devices capable of persistently storing data in non-transitory computer-readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here. In addition, the storage servers 415 support local or distributed databases for storing customer information; in one embodiment the database are MySQL databases.

Typically single uniform storage servers do not scale to more than a few dozen servers. A system architecture using pods 115, however, allows multiple smaller storage servers 415 to be associated with each pod 115. Pod-level shared storage delivers the benefit of shared storage such as the ability to restart virtual machines on a server different than where the virtual machine last ran, which provides the ability to start up, shut down, and reallocate available servers.

The computing servers 420 host the virtual machines within the pod 115 as will be discussed further in conjunction with FIG. 5. The computing servers 420 may comprise computing, routing, and/or storage servers having different processing, memory, storage, and networking capabilities according to various embodiments, and may perform all of the functions of routing servers 410 in embodiments that exclude separate routing servers 410. Additionally, the computing servers 420 can utilize different data storage systems, such as direct-attached storage (DAS), network-attached storage (NAS), or a storage area network (SAN).

The pod layer switch 405 switches network traffic into and out of the pod 115. The pod layer switch 405 may comprise one or more pod layer switches. The pod layer switch 405 typically is a Layer 2 switch, but switching is also possible at other levels of either the OSI model or other networking models. In alternate embodiments, the pod 115 may implement internal networks in addition to or distinct from the data network 310 and the management network 315.

In one embodiment, a public switch may be used for public traffic (e.g. traffic on the data network 310) and a private switch for management traffic (e.g. traffic on the management network 315). Storage traffic (e.g., traffic between the computing servers 420 and the storage servers 415 via the private switch) may be isolated from other traffic to avoid packet loss and delays that are common with regular TCP/IP traffic, and to protect the servers 240 from potentially malicious Internet traffic. In addition, the storage traffic may be directed over a higher speed switch to meet the higher performance demands of the storage system.

In one embodiment of the pod 115, the pod layer switch(es) 405 are duplicated for redundancy, with each computing server 420 connected to multiple switches. Further, it should be noted that multiple layers of switches can be coupled to effectively form a pod layer switch 405 with an increased number of ports.

In another embodiment of the pod 115 design, Virtual LANs (VLANs) are used to segment traffic while using a single pod layer switch 405. The pod layer switch 405 may support quality of service guarantees for virtual machines within the pod; the storage VLAN is then given the appropriate share of the available bandwidth on the switch to meet the IOPS requirements of such virtual machines.

The VLANs for the management, public and storage traffic may be created before the pod is deployed into production, by programming the pod layer switch 405 using the usual management interfaces. The storage server 415 is also configured to use the storage and management VLANs using the usual management interfaces of the storage server 415. In other embodiments, more than one traffic type can be directed over a single switch while other traffic types can have their own separate switches. For example, guest traffic, which refers of traffic between the virtual machines of each customer, may be segmented using VLANs and directed on the same switch as management traffic.

Figure 5:
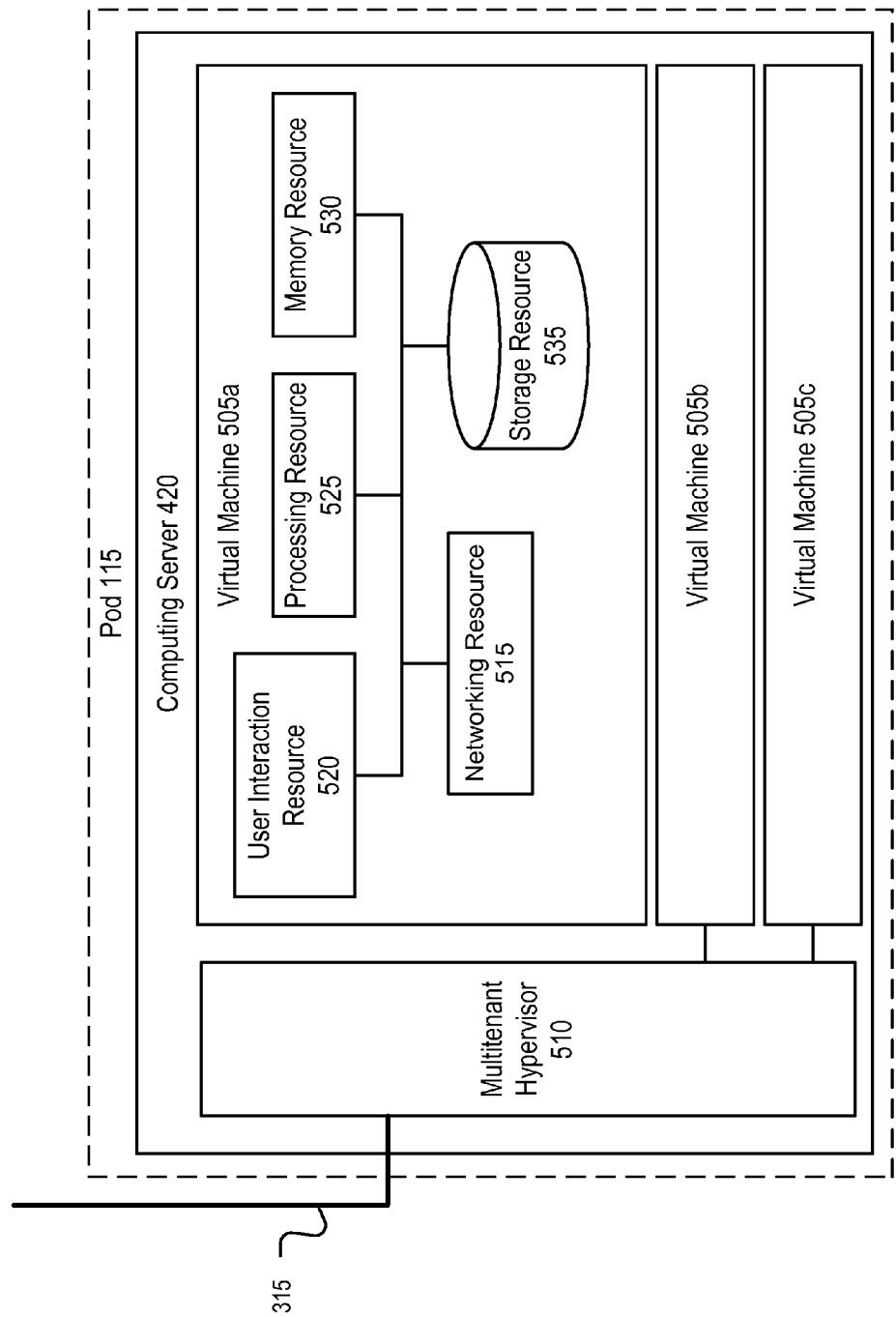
FIG. 5 depicts one embodiment of a computing server 420.

FIG. 5 depicts one embodiment of a computing server 420. The computing server 420 hosts one or more virtual machines 505 and a multitenant hypervisor 510. The computing server 420 is communicatively coupled to at least the management network 315, and may also be coupled to the data network 310 in embodiments without separate routing servers 410. In other embodiments, the virtual machines 505 and the multitenant hypervisor 510 each are individually coupled to the management network 315.

In one embodiment, the multitenant hypervisor 510 is implemented on the computing server 420 as a set of computer-executable instructions encoded onto a non-transitory computer-readable storage medium included in the computing server 420 and executed by a processor included in the computing server 420. The multitenant hypervisor 510 therefore can comprise, for example, a software layer that manages the physical computing elements (e.g., processors, memory, network cards and interfaces, data storage disks) of the computing server 420. The virtual machines 505 access and use these physical computing elements as dictated by the multitenant hypervisor 510. The multitenant hypervisor 510 can alter the allocation and accessibility of computing elements within the computing server 420 over time in response to changes in the number and configurations of hosted virtual machines 505. The changes in the number and configurations of hosted virtual machines 505 may occur, for example, because the customers 205 associated with the hosted virtual machines 505 made such a request or changes have occurred at other virtual machines 505 associated with the customer 205.

A number of virtual machines 505 may run on the computing server 420. The virtual machine 505 comprises an allocation of the computer hardware and computer software elements of the computing server 420. The virtual machine 505 simulates a physical computing device and can be configured to perform any computing task via inclusion of appropriate computer hardware and/or computer software elements therein. For example, a virtual machine 505 can simulate a physical computing device having a 1 GHz processor, 1 GB of memory, and a 16 GB hard drive.

A virtual machine 505 is associated exclusively with a single customer 205. However, a computing server 420 may host a set of virtual machines 505, each associated with different customers 205. For example, in FIG. 5, one customer 205 may be associated with virtual machine 505a, where as another customer may be associated with virtual machine 505b and 505c.

A single computing server 420 simultaneously can host virtual machines 505 associated with different customers 205, but the multitenant hypervisor 510, along with the associated management server 215, manages the hosted virtual machines 505 such that each virtual machine 505 appears to the corresponding customer 205 as a physically distinct and self-contained computing device.

In one embodiment, the virtual machine 505 comprises a processing resource 525, a memory resource 530, a storage resource 535, a networking resource 515, and a user interaction resource 520. The resources 515-535 of the virtual machine 505 comprise allocations of the computer hardware and/or computer software elements of the computing server 420, according to the units of virtual resources designated for a given customer account. The processing resource 525 comprises an allocation portion of one or more computer processors. The memory resource 530 and the storage resource 535 can comprise an allocation of any physical device or combination of physical devices capable of persistently storing computer data, such as a hard disk drive, random-access memory (RAM), a writable compact disk (CD) or DVD, a solid-state memory device, or other optical/magnetic storage mediums. Other types of non-transitory computer readable storage mediums can be used for the memory resource 530 and/or the storage resource 535, and it is expected that as new storage mediums are developed in the future, they can be configured in accordance with the teachings here. In one embodiment, the memory resource 530 provides operational memory and comprises a specified amount of RAM. The storage resource 535 provides long-term data storage and, again, can comprise any suitable type of non-transitory computer readable storage medium such as one or more hard disk drives.

The networking resource 515 comprises an allocation of computer networking hardware and software elements to enable the virtual machine 505 to communicate with other networked entities over the management network 315. One or more IP addresses can be associated with the virtual machine 505 and supported by the networking resource 515. Accordingly, the networking resource 515 can include any type of communication interface suitable for transmitting and receiving data over the network 315. For example, the networking resource 515 can comprise an Internet interface, a serial interface, a parallel interface, a USB (Universal Serial Bus) interface, an Ethernet interface, a T1 interface, a Bluetooth interface, IEEE 802.11 interface, IEEE 802.16 interface, or any other type of wired or wireless communication interface.

The user interaction resource 530 comprises hardware and software elements to enable the customer 205 or administrator 210 to interact with the virtual machine 505. For example, the user interaction resource 520 can provide display elements, such as a graphical user interface (GUI) whereby either the customer 205 or administrator 210 can interact with and manage operation of the virtual machine 505. The user interaction resource 530 can also support a keyboard, and mouse, or the like to further enable the customer 205 or administrator 210 to manage operation of the virtual machine 505.

In some embodiments, the resources 515-535 of the virtual machine 505 are supported within a single computing device, such as a server. In other embodiments, portions of the virtual machine 505 can be distributed among any number of physically separate computing devices that are communicatively coupled via the network 315. For example, the storage resource 535 can comprise multiple hard-drives residing on multiple servers. Because the resources 515-535 are communicatively coupled to one another, the virtual machine 505 appears to the customer 205 to be a single computing device that includes the cumulative capabilities of the resources 515-535 regardless of the actual physical location or distribution of any computer hardware or software elements associated with the resources 515-535.

In some embodiments, there is a specially designated virtual machine called the management domain that provides a standard set of commands to control the multitenant hypervisor 510, for example, to start and stop virtual machines, and to control the networking stack of the multitenant hypervisor 510. In other embodiments, the multitenant hypervisor 510 is hosted by a host operating system and the virtual machines operate as processes of the operating system with the multitenant hypervisor 510 providing isolation. The multitenant hypervisor 510 ensures that the virtual machines share the physical resources of the compute host such as the processor, memory, network interfaces and storage. In some cases, the multitenant hypervisor 510 defers the operation and management of the network stack and storage interfaces to the management domain or host operating system.

The physical network interfaces are shared among the virtual machines by the multitenant hypervisor 510. In one embodiment, the virtual machines get the illusion of possessing a standard physical network interface such as those provided by commercially available network interface cards. The multitenant hypervisor 510 ensures that these virtual interfaces are connected to the underlying physical network interfaces of the compute host.

The cloud infrastructure comprises a management server 215 interacting with agents that in turn interact with and control the multitenant hypervisor 510 using its standard set of commands. In one embodiment there may be one agent running in each operating system or management domain on a server 240. In other embodiments one agent may interact with a group of servers 240 whose multitenant hypervisors have been clustered using cluster management software. The agents are controlled by the management server 215.

The management server 215 also interacts with the storage servers 415 in order to create and destroy the virtual disks for the virtual machines. In one embodiment, a special version of the agent known as the storage agent runs on the processor subsystem of the storage server 415 to perform these activities. In another embodiment, the management server 215 uses the standard set of commands provided by the management server 215, or its Application Programming Interface (API) to create and destroy virtual disks.

The storage server 415 presents virtual disks to the computing server 420. In one embodiment, the virtual disks are visible as networked file systems to the multitenant hypervisor 510. In another embodiment the virtual disks are presented as block devices to the multitenant hypervisor 510. The multitenant hypervisor 510 ensures that these virtual disks are presented to the virtual machine while giving the illusion of locally attached storage to the virtual machines.

The multitenant hypervisor 510 provides a standard set of commands that the agent uses. Some examples of the command set are: start a virtual machine, stop a virtual machine, reboot a virtual machine, add or remove a virtual disk for a virtual machine, add or remove a virtual network interface for a virtual machine, mount/dismount a virtual disk from the storage server 415, add or remove VLANs from the physical network interfaces of the server 240.

The agents collect information from the computing servers 420 and storage servers 415 and report to the management server 215. The management server 215 maintains the reported information in database tables. The database includes for example: the state of the multitenant hypervisor 510, the state of the virtual machines, the configuration of the networking stack, such as configured VLANS (explained subsequently in the description of FIG. 8), IP addresses, speeds and aggregations of the physical network interfaces, storage resources visible from the compute server 420, the capabilities of the multitenant hypervisor 510, the capabilities of the storage server 415, the capacity, used and allocated size of the storage server 415, statistics such as network traffic consumed by the virtual machine, processor and memory usage of virtual machine.

The management server commands the agent to perform certain actions in response to actions by the cloud customer or cloud operator at the user interface or API. For example, when a customer starts a virtual machine, the management server 215 may look up its table of servers 240 and identify a server 240 that has enough spare capacity to satisfy the requested processing, memory and network resources for the virtual machine. The management server 215 may also look up its table of virtual machines to verify if the virtual machine is already running or if its virtual disks already exist on a storage server 415. If the virtual machine is not already running or its virtual disks do not exist, the management server 215 may command the storage server 415 or storage agent to create the disks.

The management agent then sends a start virtual machine instruction to the agent for the compute host chosen in step 1. In the start instruction are included information such as: the portion of the physical processors to allocate to the virtual machine, the virtual network interfaces to create for the virtual machine and their mapping to the physical interfaces and identification of the virtual disks to present to the virtual machine.

The agent may then instructs the multitenant hypervisor 510 on the computing server 240 (or computing server 420 in the example of FIG. 5) to mount the virtual disks from the storage server 415, create the virtual network interfaces and start the virtual machine with the desired processors, memory, network interfaces and disk. The agent verifies that the virtual machine has started using the hypervisor command set and reports the success to the management server 215. The management server 215 updates its table of virtual machines with information about the virtual machine including the server 240 it is running on.

The management network 315 handles traffic associated with the multitenant hypervisor 510 executed by the computing servers 420 within the pods 115 of the zone 110. Hence, traffic on the management network 315 may additionally comprise messages between a multitenant hypervisor 510 and a virtual machine 505 (e.g., messages related to the allocation of the physical computing elements of the particular computing server 420 to a particular virtual machine 505).

In an embodiment of the invention, network and storage isolation may comprise isolation of data alone and not quality of service. In other embodiments, the quality of service capabilities built into the multitenant hypervisor's 510 as well as network and storage hardware may be used to support enhanced isolation.

Network bandwidth throttling is used to limit the rate of traffic from each virtual machine. The operator of the cloud infrastructure may configure the management server 215 with the desired maximum network bandwidth for each virtual machine. The configuration can be done on a per-service-offering basis, a per-customer account basis or across the cloud. A management server 215 includes this maximum in the start instructions sent down to the multitenant hypervisor 510 when starting a virtual machine. The multitenant hypervisor 510 uses a standard set of commands to limit the guest traffic from the new virtual machine.

Storage bandwidth throttling is used to limit the rate of storage traffic from each virtual machine while reading or writing to a virtual disk. The operator of the cloud infrastructure may configure the management server 215 with the desired maximum IOPs bandwidth for each virtual machine. As before, the configuration can be done on a per-service-offering basis, a per-consumer basis or across the cloud. The management server includes this maximum in the start instructions send down to the multitenant hypervisor 510 when starting a virtual machine. The multitenant hypervisor 510 uses a standard set of commands to limit the storage traffic from the new virtual machine to a maximum number of IOPS as defined by the operator of the cloud infrastructure.

Figure 6:
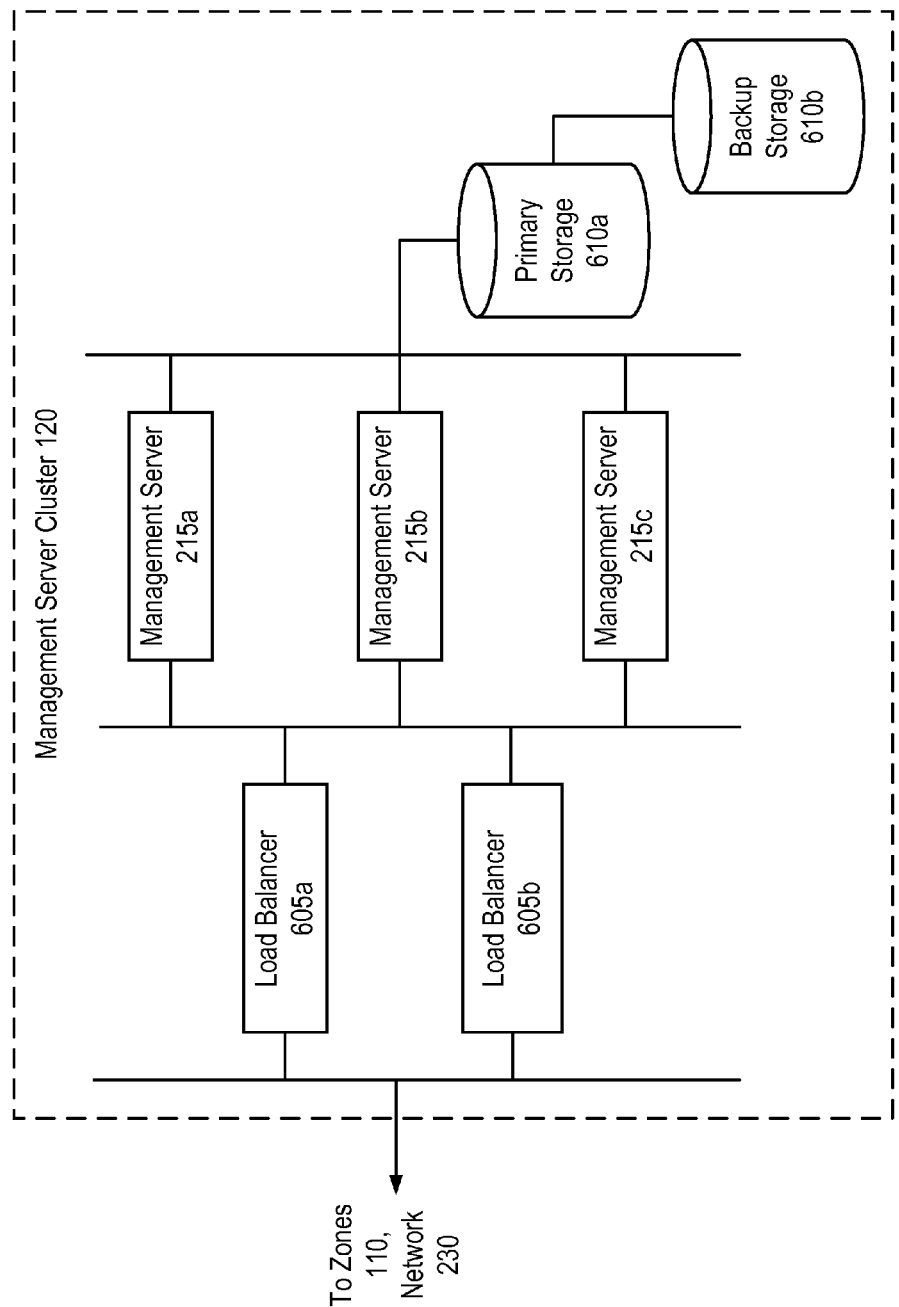
FIG. 6 shows one embodiment of a management server cluster 120.

FIG. 6 shows one embodiment of a management server cluster 120. As noted above, the management server cluster 120 is a cluster of front-end servers and their associated backend storage. The servers 215 that make up the management server cluster 120 allocate and manage use of the physical resources in the associated zones 110 by one or more customer accounts associated with units of virtual resources.

The depicted management server cluster 120 comprises three management servers 215, two load balancers 205, primary storage 610a, and backup storage 610b. Other embodiments of a management server cluster 120 may comprise different numbers of management servers 215 and load balancers 605.

The management servers 215 are communicatively coupled to the load balancers 605, and the load balancers 605 are communicatively coupled to the networks 310, 315. Thus, the management servers 215 can transmit and receive data and commands via the networks 310, 315 through the load balancers 605. The load balancers 605 distribute traffic from the networks 310, 315 and associated workload among the management servers 215 to optimize utilization of the management servers 215. In some embodiments, the load balancers 605 comprise dedicated hardware devices (e.g., multilayer hardware switching devices or severs configured to provide load balancing functionality). In other embodiments, the load balancers 605 comprise load balancing software installed on the management servers 215.

The primary storage 610a and the backup storage 610b can be implemented as any device or combination of devices capable of persistently storing data in non-transitory computer-readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the teachings here. In one embodiment, the primary storage 610a and the backup storage 610b further comprise MySQL databases. The primary storage 610a and backup storage 610b can also comprise one or more dedicated storage servers. The primary storage 610a for the management server cluster 120 is communicatively coupled to the management servers 215 and provides data storage as required by the management servers 215. The backup storage 610b is communicatively coupled to the primary storage 610a and comprises a replicated version of the data stored by the primary storage 610a. The devices in the management server cluster 120 may be Layer 2 switched.

Figure 7:
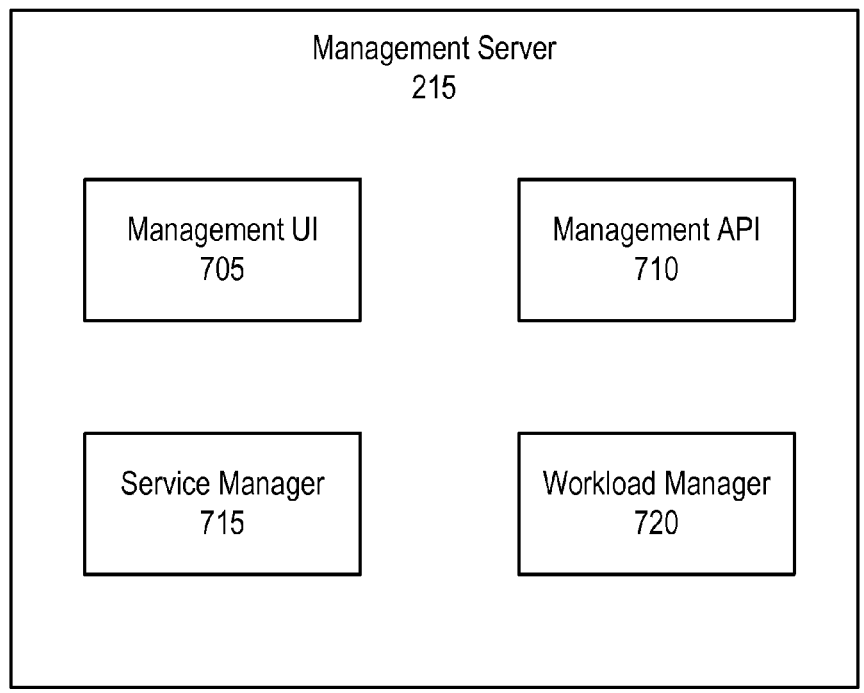
FIG. 7 is a block diagram illustrating one embodiment of a management server 215 architecture.

FIG. 7 is a block diagram illustrating one embodiment of a management server 215 architecture. The operations of the management server 215 as described herein can be controlled through either hardware (e.g., dedicated computing devices or daughter-boards in general purpose computers), or through computer programs installed in computer storage of the management server 215 and executed by one or more processors of the management server 215 to perform the functions described herein. One of skill in the art of system engineering will readily determine from the functional and algorithmic descriptions herein the construction and operation of such computer programs.

In one embodiment, the management server 215 comprises a management user interface (UI) 705, a management application programming interface (API) 710, a service manager 715, and a workload manager 720.

In one embodiment, the management UI 705 provides the primary user interface for customers 205 and administrators 210. The management UI 705 can provide a graphical user interface (GUI) that is accessible over the networks 310, 315 via a conventional web browser using any networked computing device. A customer can, for example, input specifications for configuring a new virtual machine 505 using a web GUI provided by the management UI 705. More particularly, a customer configures a virtual machine by specifying the amount of processor, storage, memory and networking resources, in appropriate units (e.g., processor speed for processors, amount in mega- or giga-bytes for storage and memory, and throughput for networking).

A customer can also interact with a configured virtual machine 505 using a web GUI provided by the management UI 705 by, for example, inputting data for processing by the virtual machine 505, viewing outputs computed by the virtual machine 505, and inputting commands related to a complete or partial shutdown of the virtual machine 505. The management UI 705 can provide a different web GUI for a customer 205 than for an administrator 210.

One embodiment of the management API 710 allows an administrator 210 (or a customer 205 with appropriate access credentials) to further oversee virtual machine 505. For example, the management API 710 can enable customization of the primary user interface provided by the management UI 705. The management API 710 can also allow customization of billing policies and procedures, as well as access policies (e.g., granting different levels of access to a virtual machine 505 based on credentials associated with a customer 205).

The service manager 715 communicates with computing servers 420 to oversee the creation, operation, and shutdown of virtual machines 505. For example, the service manager 715 can receive specifications for a virtual machine 505 from the management UI 705, select a computing server 420 suitable for hosting the virtual machine 505, and transmit commands to the selected computing server 420 that case the computing server 420 to implement the virtual machine 505. Once the virtual machine 505 is configured and implemented on the computing server 420, the service manager 715 can monitor its operation and implement corresponding billing and access policies, e.g., via routing appliance 805 discussed further in FIG. 8. For example, the service manager 715 can bill a customer $20 per hour of operation for a virtual machine 505 with processing equivalent to a 1 GHz processor, memory equivalent to 1 GB of RAM, and storage equivalent to a 250 GB hard drive, as well as $0.10 per GB of network traffic associated with the networking resource of the virtual machine 505.

The workload manager 720 interacts with the multitenant hypervisors 510 installed on the computing servers 420. The workload manager 720 monitors the status (e.g., availability and workload) of the different physical computing elements included in the computing servers 720. The workload manager 720 can also oversee the transfer of a virtual machine 505 from a first computing server 420 to a second computing server 420 upon failure of the first computing server 420 or an imbalance of workload between computing servers 420.

Figure 8A:
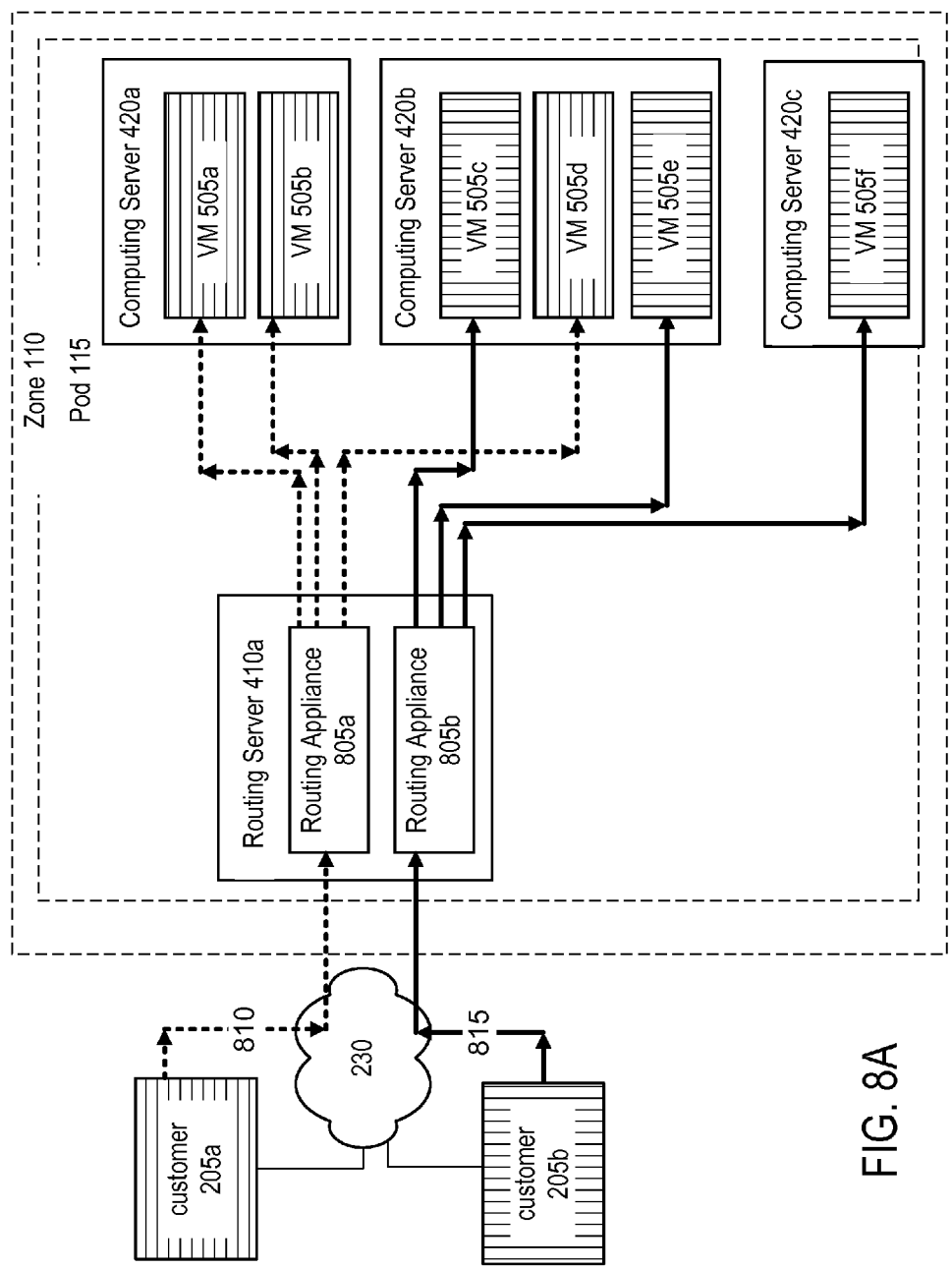
FIG. 8A is a conceptual diagram showing one embodiment of an overlay of the virtual machines on the physical devices.

FIG. 8A is a block diagram showing one embodiment of an overlay of the virtual machines allocated to two customers 205a, 205b on the physical devices, e.g., virtual machines 505a-505f. As shown, virtual resources such as virtual machines 505, are allocated to customer accounts associated with customers 205a and 205b. In this example, virtual machines 505a, 505b, and 505d are allocated to customer 205a and virtual machines 505c, 505e, and 505f are allocated to customer 205b. The virtual resources correspond to physical resources within various computing servers 420 within a pod 115 and zone 110. Note that some of the physical resources are shared, at least in part, by customers 205a, 205b. For example, computing server 420b is shared by both customers 205a, 205b.

In a cloud infrastructure serving multiple customers, the administrator 210 may ensure that accesses are secure and protected against attacks from malicious customers, by allocating resources on demand for instance. Routing appliances 805 run as virtual machines in the system to provide functionalities such as routing, DNS, load balancing, console access, etc. When they are no longer needed, they are garbage collected to release any precious system resources that they are holding. The routing appliances 805 may be hosted by the routing server 410.

The eth0 interface of a routing appliance 805 serves as the gateway for the guest virtual network and has the IP address of 10.1.1.1, which is configurable. The eth1 interface of the routing appliance 805 resides on the management network 315 and is used to configure the routing appliance. The eth2 interface is assigned a public IP address on the data network 310.

As indicated in FIG. 8A, VMs associated with customers 205a and 205b are segmented on the same physical network. In order for the VMs associated with a customer 205 to access the internet or to accept connections from the internet (such as ssh), a routing appliance may be started up for the VM. In the example of FIG. 8A, customer 205a accesses virtual machines VM 505a, 505b and 505d through routing appliance 805a hosted on computing server 420a, while customer 205b accesses virtual machines VM 505c, 505e and 505f through routing appliance 805b. While physical resources such as network and physical server are shared, the networks of customers 205 are segmented and cannot see each other.

When a customer 205 starts a VM in a certain zone 110, a management server 215 determines if a routing appliance 805 for that customer 205 is already running within that zone 110. If it is not, the routing appliance 805 is started prior to the actual start of the VM. As the VM starts, the routing appliance 805 may then provide network functionalities such as DHCP, DNS, routing, load balancing, and firewall protection to the VM. After the last VM associated with customer 205 is stopped, the management server garbage 215 may garbage collect the routing appliances 805 after a defined interval. One routing appliance 805 may be needed per customer account per zone 110.

In one embodiment, each customer 205 is assigned a guest virtual network in each zone 110. A guest virtual network may be configured to any private address space, for example the Class A network in 10.0.0.0/8 private address space. The guest virtual network is an overlay network on top of the management network 315 and is managed by the multitenant hypervisor 510.

A guest virtual network may be valid within one zone 110. Therefore virtual machines in different zones 110 cannot communicate with each other using their IP addresses in the guest virtual network. Virtual machines in different zones 110 communicate with each other by routing through a public IP address.

A routing appliance 805 is associated with each guest virtual network. The routing appliance 805 automatically assigns an IP address for each virtual machine associated with the customer 205, for example, in the 10.0.0.0/8 network. The customer 205 may manually reconfigure virtual machines to assume different IP addresses as long as the customer 205 does not introduce IP address conflicts.

Source NAT is automatically configured in the routing appliance 805 to forward out-bound traffic for all virtual machines associated with the customer 205. The customer 205 may configure port forwarding rules to direct inbound public traffic to the virtual machines associated with the customer 205. A management server 215 programs the routing appliance 805 and the firewall 320 according to the port forwarding rules specified by the customer 205. A customer 205 may also configure a software load balancer running on the routing appliance 805 to dispatch inbound traffic to multiple virtual machines associated with the customer 205 according to customer-specified load balancing rules.

The cloud infrastructure can support multiple guest virtual networks per customer 205. The concept of routing appliances 805 as virtual machines may be generalized to include virtual machines with multiple virtual NIC interfaces and connected to multiple guest virtual networks. The virtual NIC interfaces are discussed further in conjunction with FIG. 8B.

As shown in FIG. 8A, although some of the physical resources are shared by the customers 205a, 205b, traffic between the two customers 205a, 205b and their virtual machines 505 is segmented using two separate routing appliances 805, as are the individual virtual machines 505 assigned to each customer 205.

The customer 205 can provide a functional specification for the virtual machine 505 (i.e., that the virtual machine 505 be capable of performing one or more specified computing tasks while meeting specified performance criteria) or the customer 205 can provide a resource specification for the virtual machine 505 (i.e., that the virtual machine 505 include specified computing resources such as hardware and/or software elements). The virtual machine 505 can also be configured according to any number of default specifications. Once the virtual machine 505 is configured, the customer 205 can access the virtual machine 505 over the network 230 and thereby interact with the virtual machine 505 to accomplish tasks as desired. For example, the customer 205 can utilize remote access software such as secure shell and/or virtual displays to control the virtual machine 505.

Figure 8B:
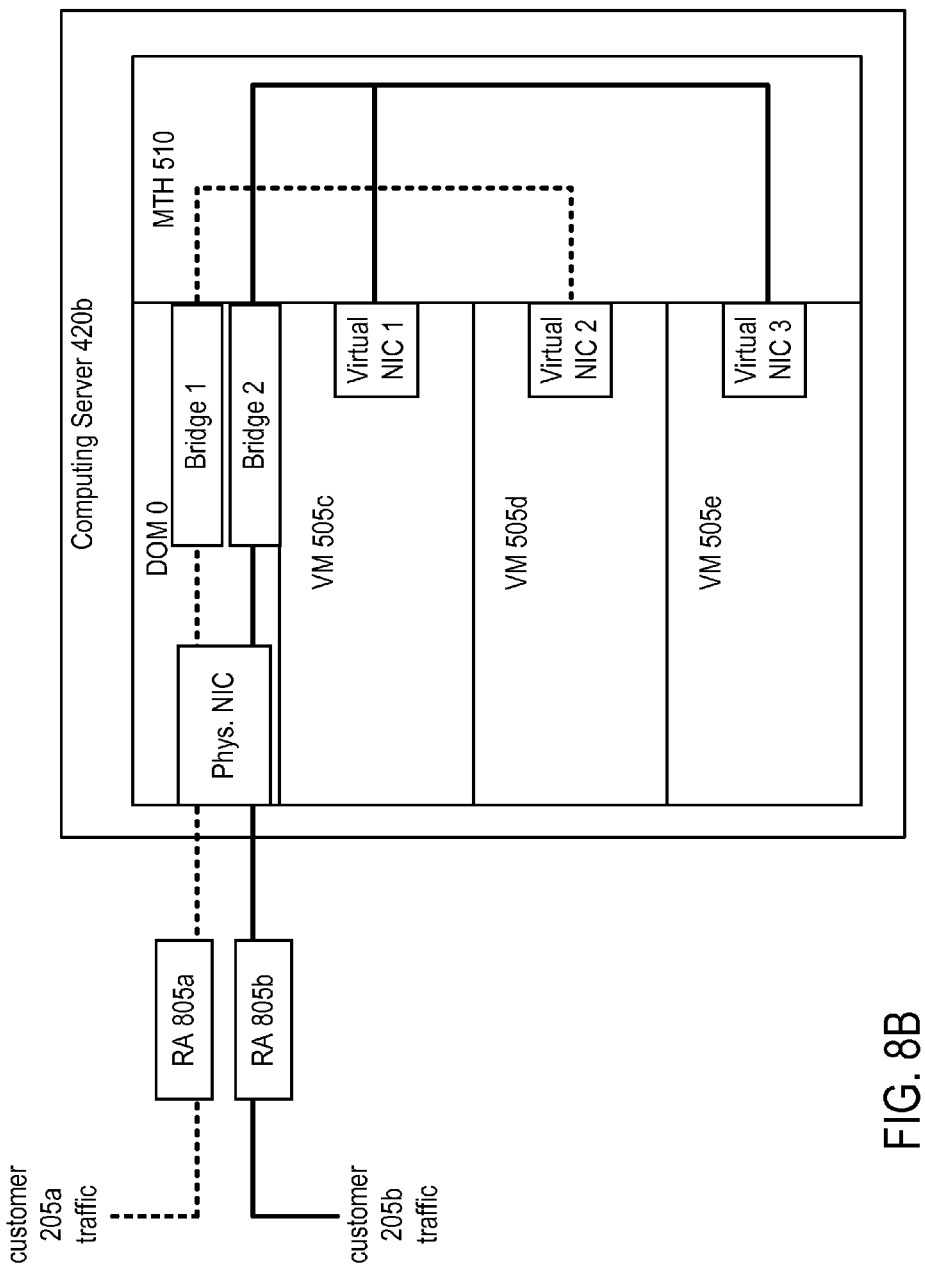
FIG. 8B shows additional detail for one embodiment of traffic routed between the different virtual machines 505c-505e within computing server 420b, when the traffic is to/from two different customers 205a, 205b.

FIG. 8B shows additional detail for one embodiment of traffic routed between the different virtual machines 505c-505e within computing server 420b, when the traffic is to/from two different customers 205a, 205b. Traffic from customer 205a goes through routing appliance 805a, when it meets the physical NIC of domain zero ("DOM 0") associated with the corresponding virtual machine (505d), it goes through a separate bridge (1) reserved only for traffic from customer 205a before being routed to Virtual NIC2 for virtual machine 505d. In some embodiments of the invention, the domain zero is also the multitenant hypervisor 510.

The agent running on the computing server 420, on behalf of the management server 215 ordering the instantiation, sets up a number of virtual networking components that co-operate to achieve communication between the virtualized operating system and the hardware. The virtual NIC is an emulated network adapter that shuttles traffic back and forth between dom0 and VM 505. The bridge is a virtual switch that shuttles traffic back and forth between two segments-in this case, the network adapter of the customer virtual machine and VLAN network adapter. The bridge may also comprise a VNIC in some embodiments. The VNIC is a pseudo-network adapter that tags and untags frames in the communication using a standard, for example the 802.1q trunking standard.

Similarly, traffic from customer 205b goes through routing device 805b, and when it meets the physical NIC of DOM 0, it goes instead through a separate bridge (2) for customer 205b traffic, before reaching virtual NIC1 or virtual NIC3 of virtual machines 505c and 505e, respectively. Note that even though customer 205b has two virtual machines (505c, 505e) within the computing server 420b, it has only one bridge (2), as only one is needed for each customer 205b. Doing so allows traffic for the same customer (205b) to be seen, but not traffic to/from other customers (e.g., 205a) on the same computing server 420b.

The cloud infrastructure combines physical host-based network virtualization and physical network/VLAN-based network virtualization. Each customer's virtual machine gets the illusion of participating in a physically distinct local area network, with the customer's other virtual machines. It is possible for example that both customer A's private network and customer B's private network is in the IP address space 10.1.1.0/24 but they never see each other's packets. It is possible that the networks addresses are not shared as well.

A prospective customer 205x may contact the administrator 210, requesting resources from the cloud infrastructure. The administrator 210 registers a customer account in the name of customer 205x. A management server 215 reserves and assigns a unique VLAN ID Vx, for example within the 802.1q VLAN range (12-bit number totaling 4000 possible unique IDs) to the customer. If no unused VLAN IDs are found, the customer 205x is informed that it is not possible to start a virtual machine.

In some embodiments, this ID is stored in a database that the management server 215 uses. The customer 205x now starts a virtual machine within the cloud infrastructure and the management server 215 orders the instantiation of a virtual machine within one of the computing servers 420.

Vy is then transmitted to the agent running on the computing server 420 in question, as part of the virtual machine instantiation procedure. The agent uses Vy to set up a tagged VLAN interface that will shuffle the correct traffic back and forth between the network and the virtual machine. In some embodiments, this setup communication happens through the management network 315. The management network 315 shares the same physical network but is effectively segmented from other customers because it has a different (or no) tag.]

Traffic coming out of the virtual machines set up in this fashion will be tagged with the VLAN number as the packet travels through the multitenant hypervisor 510; traffic coming into that interface tagged with Vy will be unwrapped from the tagged frame and delivered to the appropriate virtual machine based on the MAC address.

When a virtual machine associated with a customer actually starts on a particularly server 240, the virtual NIC required to provide multi-tenancy is created on the server 240 and associated with the virtual machine to provide segmented network access. When the user VM is stopped, the virtual NIC is destroyed (i.e. garbage collected) and its resources returned to the server 240.

In the embodiment of FIG. 8B, for VM 505c and VM 505e, there's only one virtual NIC and bridge created because they belong to the same customer and the virtual machines are allowed to see each other's traffic. This makes the virtual NIC garbage collection more difficult as the agent cannot terminate the bridge until all virtual machines for that customer are stopped on that server 240. Each bridge and virtual NIC created requires resources on the server 240 in terms of memory. The agent may create and garbage collect bridges and virtual NICs as needed.

Figure 9:
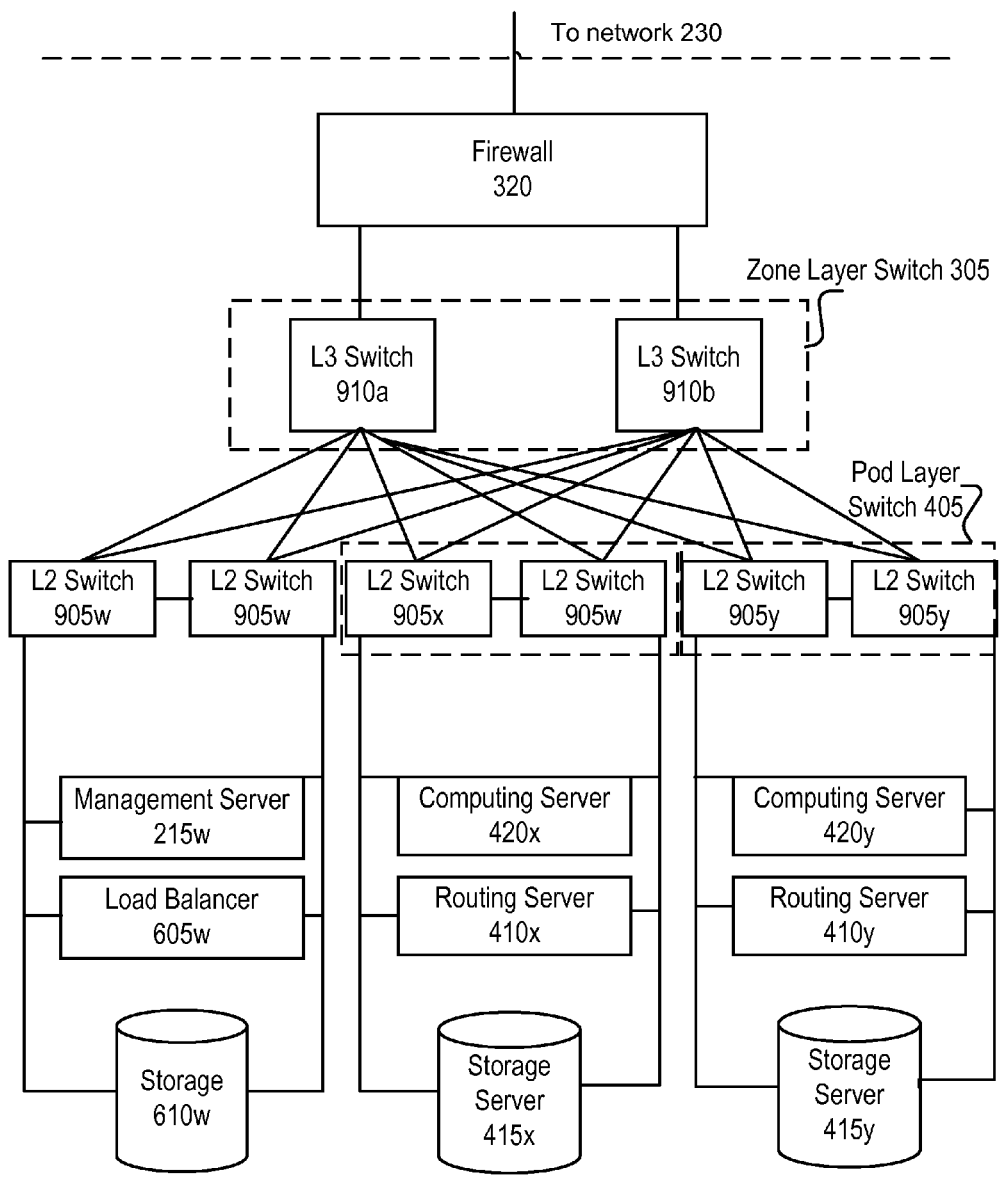
FIG. 9 illustrates switching at different layers in the network architecture of the scalable cloud infrastructure in accordance with one embodiment.

FIG. 9 illustrates switching in the network architecture of the scalable cloud infrastructure, in accordance with one embodiment. For the sake of illustration, two pods each with one computing server 420, one routing server 410 and one storage server and an MSC 120 with one management server 215, one load balancer 605 and one storage 610 are displayed. The firewall 320 provides connection to the network 230 and is configured in routing mode. The firewall 320 forwards HTTP requests and API calls from the network 230 to a management server 215. The public traffic, which may be routed on a VLAN, also passes through the firewall 320 en-route to the zone layer switch 305. Additionally, in some embodiments, the firewalls 320 may route traffic on internal networks between pods 115. In certain embodiments, the firewall 320 enables site-to-site VPN such that servers 240 and management servers 215 in different zones 110 can reach each other.

In the embodiment of FIG. 9, the zone level switch 305 comprises two layer-3 switches L3 switches 910. Additionally, redundant pairs of layer-2 switches L2 switches 905 are deployed in the pod layer switches 405. In large deployments of pods 115 that include multiple racks, a second level of pod layer switch 405 may be deployed.

Virtual Machine Live Migration

In order to minimize any performance penalty resulting from virtual machines associated with a customer account being scattered across a number of pods and computing servers—referred to herein as "fragmentation"—customer virtual machines are preferably consolidated within one or more computing servers 420 of a pod 115. Consolidation, also referred to herein as "defragmentation" consolidates a set of customer virtual machines of a given customer account with their associated system appliances to minimize cross computing server or pod traffic. Live migration facilitates this process. As computing resources are made available on a computing server 420 hosting one or more customer 205 virtual machines 505, management server 215 may migrate one or more fragmented machines belonging to the customer 205 to computing server 420, thereby defragmenting the customer account.

In embodiments within the scalable cloud architecture discussed herein, virtual machines 505 are typically consolidated on computing servers 420 operating the routing appliance 805 belonging to the customer 205. While consolidating customer virtual machines 205 around routing appliances 805 within a single computing server 420 or pod 115 is preferred for customer 205 experience and performance reasons, virtual machines 505 are free to migrate anywhere resources are available. For instance, virtual machines 505 may undergo live migration before the shutdown of one or more computing servers 420 for maintenance, thus preventing any disruption of traffic for customer 205.

Figure 10:
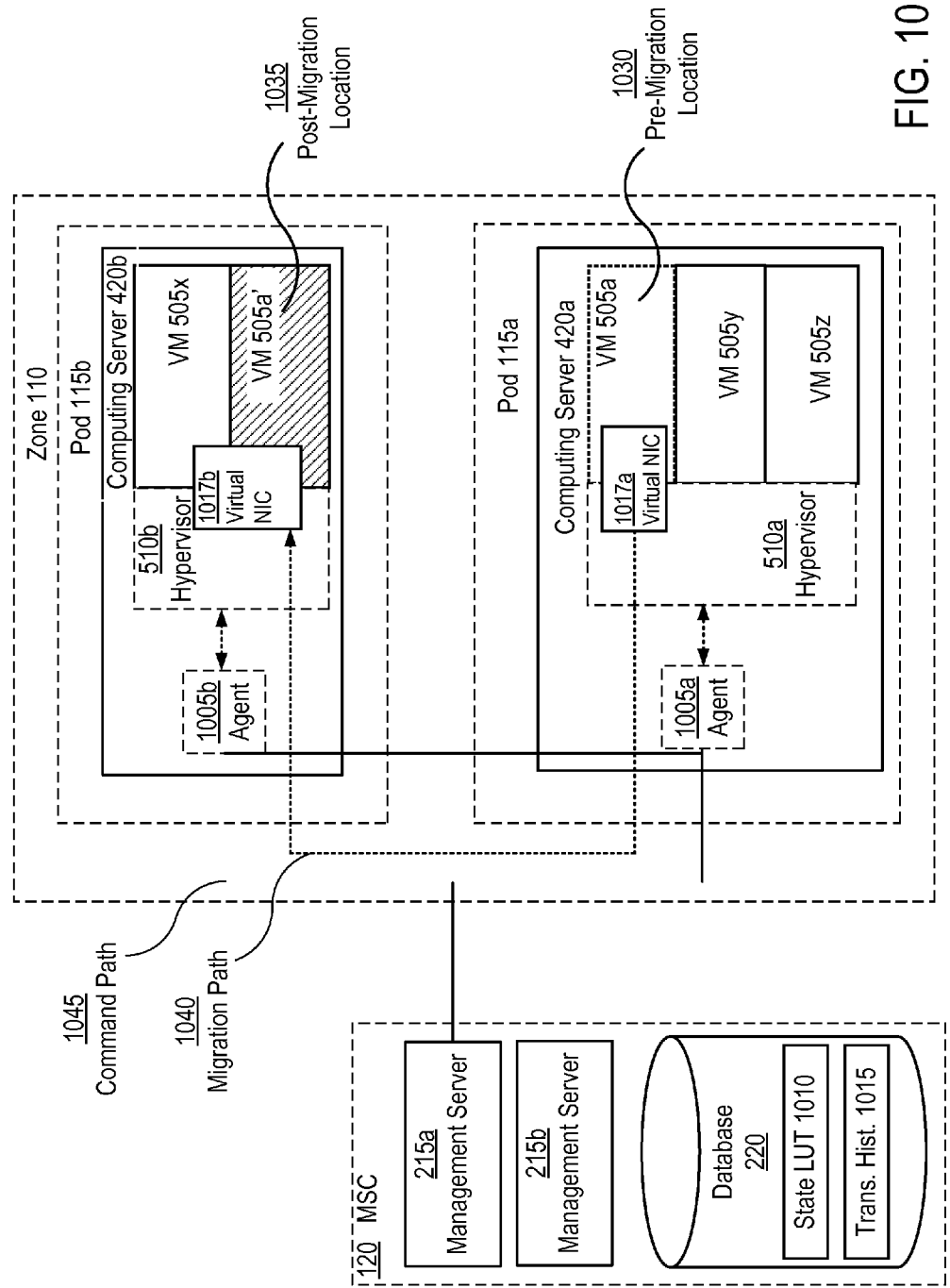
FIG. 10 illustrates one embodiment of the elements used to manage live migration and defragment customer networks in a virtual computing environment.

FIG. 10 illustrates one embodiment of the elements used to manage live migration in a virtual computing environment. Management server cluster 120 includes management servers 215 and database 220 for storing customer 205, administrator 210 and virtual machine 505 information. Management servers 215 manage database 220 and store information in a number of tables. FIG. 10 illustrates the database 220 including a state look up table ("LUT") 1010 and a transaction history 1015 used to store data associated with virtual machine 505 state management. Computing server 420 includes an agent 1005 application or API for transmitting information to and receiving commands from management servers 215. In one embodiment, both agents 1005 report to management server 215a. Alternatively, agent 1005a reports to management server 215a and agent 1005b to management server 215b.

State LUT 1010 is a database 220 structure containing current states and possible next states for managed virtual machines 505. Management servers 215 access state LUT 1010 to determine whether a desired state change is valid. Transaction history 1020 is a database 220 structure containing transactional history for migration events. Management servers 215 receive state and virtual machines 505 information from agents 1005 and update associated data in transaction history 1020. Customer 205 and administrator 210 data and migration event requests are received at management servers 215 and stored in transactional history 1020. Event requests may specify the migration of virtual machines 505 across computing servers 420, or pods 115. In some embodiments, virtual machines may be migrated across zones available to customer 205. Additionally, management servers 215 may implement logic to defragment the virtual machine environment and issue migration events for a virtual machine 505 or number of.

FIG. 10 illustrates a shared database 220 in management server 220. In other embodiments each management server 215 operates separate databases and forward entries to the management server 215 or cluster 120 receiving the migrated virtual machine 505. Database 220 may also implement business logic associated with information entries such as determining the validity of a new entry or a desired action and notifying the management server 215 submitting the entry. Alternatively, management servers 215 may perform required business logic and simply access and update information in database 220. State LUT 1010 and transaction history 1015 may be implemented as one or more tables in one or more databases 220 depending on architecture and equipment capability.

In some embodiments where management servers 215 share a common database 220, agent 1005b communicates only with management server 215b as the current database 220 entries from management server 215a are still applicable. In some embodiments, management server 215a notifies agent 1005b to prepare for a migrating virtual machine 505 regardless of which management server 215 agent 1005b reports to. In embodiments where management servers 215 operate separate databases, management servers 215 may forward virtual machine information to or access virtual machine information on other management servers 215 or their databases. Thus, the agent 1005 receiving the migrated virtual machine updates 505 reports to a management server 215 with access to corresponding virtual machine information stored in its own database or shared database 220.

Agent 1005 also interacts with and controls hypervisor 510 using a standard set of commands. Some examples of available commands are: Start a virtual machine stop a virtual machine, reboot a virtual machine, add or remove a virtual disk for a virtual machine, add or remove virtual network interfaces for a virtual machine, mount or dismount a virtual disk from the storage resource, and add or remove VLAN's from the physical network interfaces of the compute host.

In one embodiment, at least one agent 1005 runs on each computing server 420 and controls at least one hypervisor 510. Alternatively, agent 1005 may operate a number of clustered hypervisors 510 on one or more computing servers 420 in a pod 115 or zone 115. FIG. 10 illustrates an embodiment using one agent 1005 per computing server 420. While only one hypervisor 510 is shown, a number of may reside on computing server 420 and communicate with agent 1005. Referring to FIG. 10, agent 1005 collects virtual machine 1035 information from hypervisor 510 and reports the information to management server cluster 120. Agent 1005 also receives commands from management servers 215 and communicates with hypervisor 510 to convert commands into virtual machine 505 actions.

Virtual NICs 1017 are emulated network adapters that shuttle network traffic back and forth between hypervisor 510 and virtual machines 505. In one embodiment, each customer 205 is assigned a virtual NIC 1017 at hypervisors 510 managing one or more of their virtual machines 505 and a routing appliance 805 (not shown) within zone 110. Routing appliance 805 communicates network traffic associated with customer 205 to the various hypervisors 510 operating assigned virtual NICs 1017 for the customer 205.

FIG. 10 additionally illustrates a simplified diagram of the live virtual machine migration process. In one embodiment, customer 205 operates virtual machines 505a and 505x associated with virtual NIC 1017. The customer's virtual machines reside on both pods 115a and 115b, respectively, and communicate through virtual NICs, 1017a and 117b, respectively to hypervisors, 510a and 510b, respectively. Hypervisors 510a and 510b communicate and receive customer 205 network traffic via routing appliance 805 (not shown). Management server 215a communicates with agent 1005a and 1005b via command path 1045. Agents 1005 control their respective hypervisors 510 during the live migration process. Specifically, agent 1005a instructs hypervisor 510a to migrate virtual machine 505a to computing server 420b and agent 1005b instructs hypervisor 510b to receive migrating virtual machine 505a.

To begin the migration of virtual machine 505a, management server 215a determines the pre-migration location 1030 of virtual machine 505a and the post-migration location 1035, illustrated as virtual machine 505a'. In one embodiment, virtual machine 505x also belongs to consumer 205 and management server 215a migrates virtual machine 505a during a defragmentation process. Database 220 contains pre-migration locations for virtual machines as their current physical location, such as computing server 420, pod 115, agent 1005, or hypervisor 510 addresses (e.g. an IP) depending on the embodiment. Post-migration locations are determined by the management server 215 according to the reason for migration. For example, during a computing server 420 shutdown, virtual machines 505 may be migrated to any server 420 or pod 115 having available resources as indicated in database 220. In a defragmentation process, as discussed in sever embodiments herein, management server 215 may determine a post-migration location from database 220 entries for allocated system appliances or other customer virtual machines 505. In one embodiment, as customer 205 already has a virtual NIC 1017b on destination hypervisor 510b, a new one need not be created. Alternatively where a virtual does not exists, management server 215a commands agent 1005b to allocate and create the virtual NIC 1017b network resource assigned to customer 205 on hypervisor 510b prior to migration.

Figure 11:
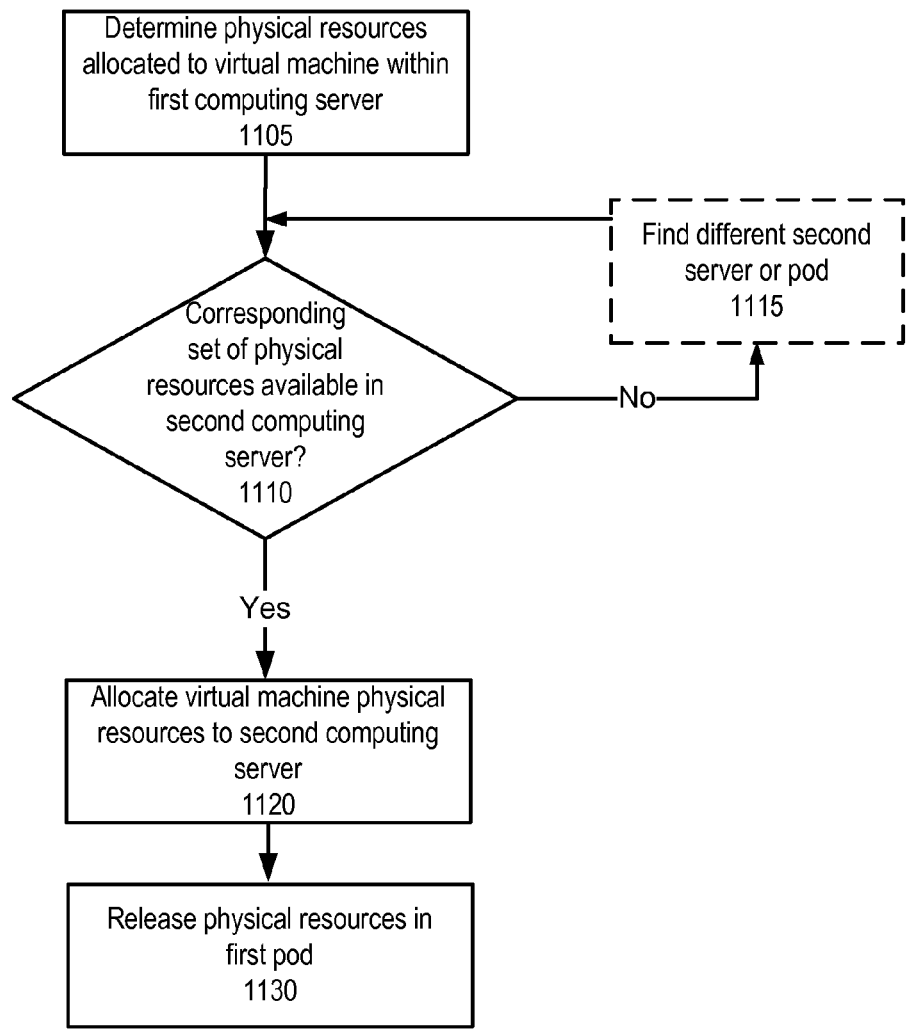
FIG. 11 is a flow chart illustrating one embodiment of management server logic for determining if a virtual machine can be migrated.

Management server 215a determines whether the set of processing 525, networking 515 and storage 535 resources allocated to virtual machine 505a on computing server 420a is available on computing server 420b prior to the migration of virtual machine 505a. FIG. 11 as discussed herein embodies such a process carried out by management server 215a.

FIG. 11 is a flow chart illustrating one embodiment of management server logic for determining if a virtual machine can be migrated. The management server determines 1105 physical resources allocated the virtual machine within the first computing server and checks 1110 whether a corresponding set of physical resources are available within the second computing server. Responsive to the determination, virtual machine physical resources are allocated 1120 to the second computing server. Once the allocation 1120 process successfully completes, the virtual machine is migrated to the second computing server and physical resources are released 1130 from the first computing server. Optionally, if the second server does not have enough resources available, a different computing server or pod may be found 1115. For example, if a whole computing server 420 or pod 115 is taken offline for maintenance, a number of virtual machines 505 are migrated to other computing servers 420 or pods 115. During defragmentation, however, a number of algorithms may coordinate the live migration of virtual machines 505 based on network traffic between one or more virtual machines 505, a measure of fragmentation, or other rubrics.

Referring again to FIG. 10, management server 215a may determine the set of resources allocated to virtual machine 505a from database 220, agent 1005a, or combination of via command path 1045. Management server 215a determines whether the set of resources allocated to virtual machine 505a is available on computing server 420b in a similar fashion. Responsive to determining whether computing server 420b is capable of receiving migrating virtual machine 505a, management server 215 instructs agent 1005b to create virtual NIC 1017a on hypervisor 510b. However, as discussed previously, virtual NIC 1017b already exists for customer 205 and the network allocation process is skipped. Agent 1005b notifies management server 215a it is ready for migration via command path 1045. In some embodiments, agent 1005b may also return the hypervisor 510b or computing server 420b IP address for the post-migration location 1035. Alternatively, management server 215a maintains the IP address for computing server 420b, hypervisor 510b or both in database 220.

In one embodiment, management server 215a issues the migration command to agent 1005a with the destination hypervisor 510b or computing server 420b IP address. Agent 1005a subsequently instructs hypervisor 510a to migrate virtual machine 505a to hypervisor 510b. Hypervisor 510b receives migration data from hypervisor 510a over migration path 1040 and constructs the migrating virtual machine 505a in post migration location 1035 as virtual machine 505a'. Storage 535 resources in the form of disk snapshots, disk images, OS snapshots and OS images may facilitate the construction of migrated virtual machines. In other embodiments, hypervisor 510a transfers virtual machines 505 storage volumes directly without an intermediate step. In live migrations, hypervisors 510 are capable of migrating virtual machine 505a complete with memory and instruction counters to prevent process interruption. Thus, once all memory and instruction counters along with allocated processing 525, networking 515 and storage 535 resources are migrated to virtual machine 505a' it begins functioning as virtual machine 505a did prior to migration. Agent 1005a notifies management server 215 when the process is complete and stops virtual machine 505a to prevent multiple instances of the migrated virtual machine 505a. In some embodiments, the notification is a virtual machine 505 state and management server 215a determines from the state and information in database 220 whether the migration was successful. Management server 215a may also request an update from agent 1005b to determine the state of virtual machine 505a'.

At this point, the one or more agent 1005 have indicated whether the migration of virtual machine 505a to computing server 420b has either succeeded or failed at this point. In one embodiment, successful migration results in virtual machine 505a entering a stopped state and virtual machine 505a' running on computing server 420b. If migration is unsuccessful, management server 215a conducts further state inquiry at agents 1005. In some embodiments, once management server 215a determines migration was successful, unused customer 205 resources associated with virtual machine 505a are released on computing server 420a. Additionally, if management server 215 determines that customer 205 does not operate any additional virtual machines on hypervisor 510a, virtual NIC 1017a and associated resources are released on computing server 420a.

Figure 12A:
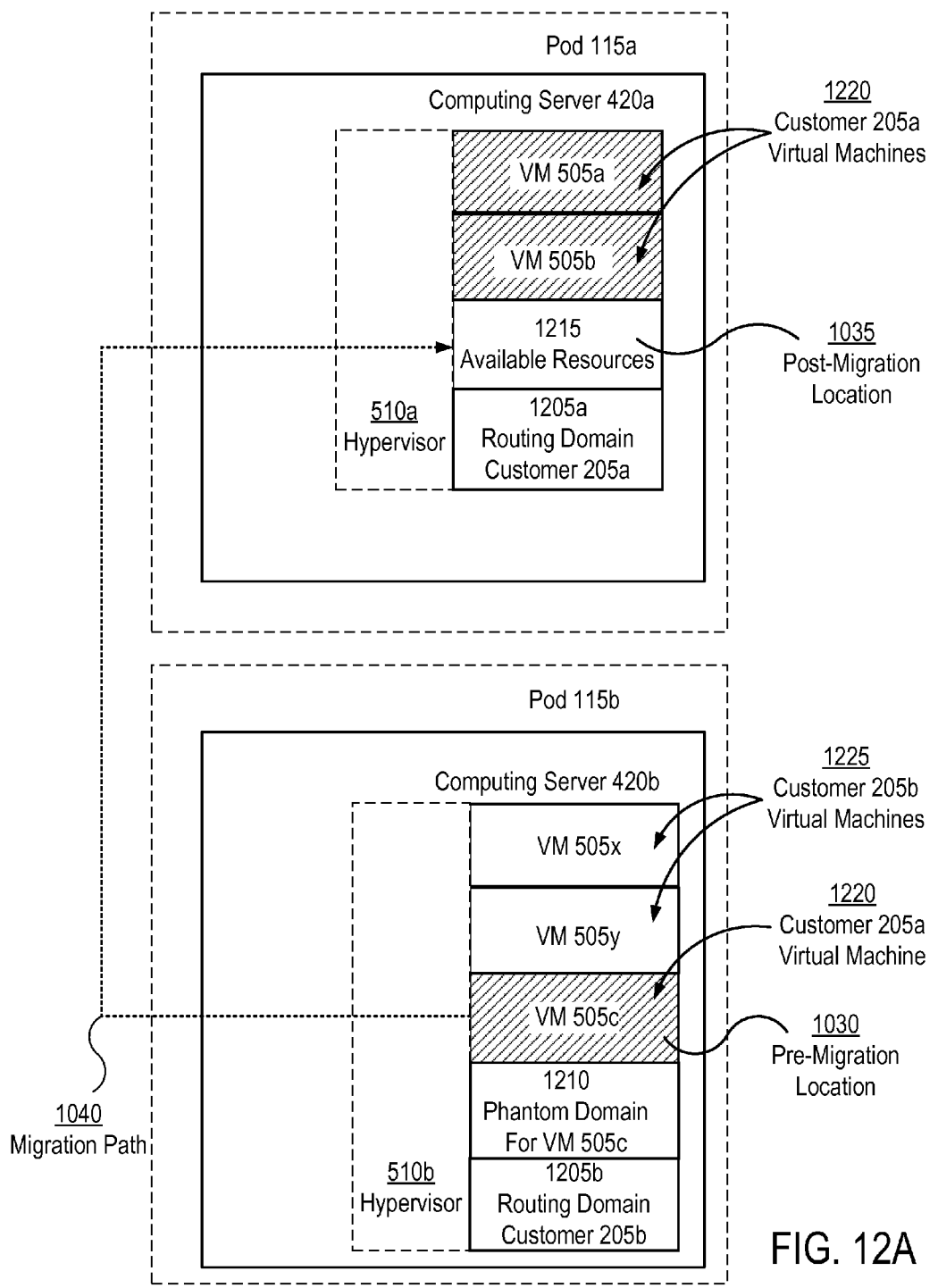
FIG. 12A illustrates an example of customer network defragmentation.

FIG. 12A illustrates one embodiment of customer network defragmentation. Customer 205a virtual machines 1220 are spread across pods 115a and 115b. Customer 205b operates virtual machines 1225 on pod 115b. Each customer 205 has a routing domain 1205 to handle network traffic for their virtual machines 505. Routing domain 1205a resides on computing server 420a and handles traffic for customer 205a virtual machines 505a-c. Customer 205a also requires a phantom routing domain 1210 on computing server 420b for virtual machine 505c on computing server 420b. In some embodiments, routing domains 1205 are the primary routing appliance while secondary phantom domains 1210 facilitate cross pod 115 routing as necessary. Phantom routing domain 1210 communicates network traffic between routing domain 1205a and virtual machine 505c to establish the VLAN for customer 205a.

Figure 12B:
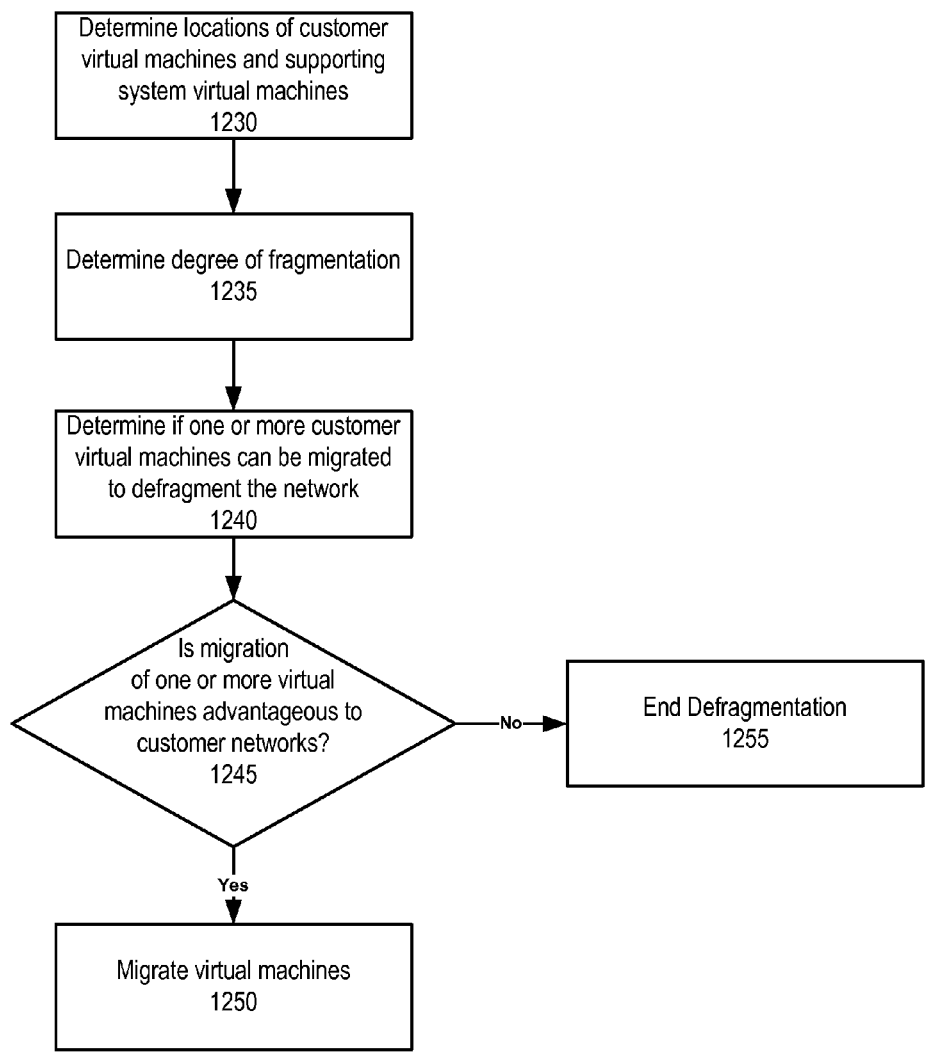
FIG. 12B is a flow chart illustrating one embodiment of management server logic for defragmenting a virtual network.

In one embodiment, a management server 215 determines the defragmentation of the virtual network for customer 205a according to the defragmentation process illustrated in FIG. 12B. Management server 215 determines 1230 the locations of customer virtual machines and supporting system machines. In some embodiments, management server locates all phantom 1210 and routing 1205 domains for each customer and determines 1235 a measure of fragmentation for each network. Management server 215 may then determine 1240 the available resources 1215 on the computing server 420 hosting the customer routing domain 1205 and within the pod 115. If resources are available, management server 215 determines 1245 whether the migration of one or more virtual machines is advantageous to the customer network. This process may comprise a number of algorithms that consider network activity between virtual machines 505 within phantom domains 1210 and between phantom domains 1210 and the customer routing domain 1205. In some instances, for example, two virtual machines 505 on a phantom domain 1210 may utilize significant network resources locally, thus it would more advantageous to migrate another virtual machine 505 consuming a greater amount of routing domain 1205 traffic. If management server 215 determines that no optimization can be made, the defragmentation process ends 1255. Otherwise, management server 215 coordinates the migration 1250 of one or more virtual machines to defragment the customer 205 network.

Referring again to the embodiment of FIG. 12A, the management server 215 determines the migration of virtual machine 505c from location 1030 to 1035 as advantageous to customer 205a. Management server 215 coordinates the migration of virtual machine 505c to available resources 1215 along migration path 1040 as discussed previously. Once virtual machine 505c has migrated to post migration location 1035 and all customer 205a virtual machines 1220 are running on computing server 420a, defragmentation is complete for customer 205a. In some embodiments, management server 215 terminates phantom domain 1210 to release resources on computing server 420b as the domain no longer communicates network traffic for customer 205a virtual machines 1220.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising computer program code stored on a non-transitory, tangible computer readable storage medium, which is configured to be executed by a computer system for performing any or all of the steps, operations, or processes described. A computer system is understood to include one or more computers, each computer including one or more hardware-based processors, primary memory devices (e.g., RAM, ROM), secondary storage devices (e.g., hard discs or solid state memory), and networking devices (e.g., networking interface cards). The computers in a computer system can be interconnected by wired medium (e.g. Ethernet, fiber optic), or wireless medium (e.g., radio-based networks, such as 802.11, 802.16), or combination thereof.

Embodiments of the invention may also relate to an apparatus for performing the operations herein. This apparatus may be specially constructed for the required purposes, and/or it may comprise a general-purpose computing device selectively activated or reconfigured by a computer program stored in the computer.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A method for defragmenting a virtual machine network of a customer, the virtual machine network comprising a plurality of virtual machines associated with the customer, the virtual machine network spanning one or more pods, wherein each pod comprises a set of physical resources in a zone, the physical resources comprising physical, storage, and network resources, the method comprising:
- identifying first virtual machines of the customer in a first pod operating a first portion of the virtual machine network of the customer;
- identifying additional virtual machines associated with the customer and outside the first portion of the virtual machine network;
- determining a measure of network fragmentation of the customer network, the measure indicating a degree to which virtual machines of the customer are distributed across multiple pods;
- determining available resources in the first pod for migrating one or more of the additional virtual machines to the first pod, and whether the measure of network fragmentation indicates an advantage to the customer network by migrating one or more of the additional virtual machines to the first pod to reduce the network fragmentation; and
- based on the available resources and the measure of network fragmentation indicating the advantage to the customer network, migrating one or more of the additional virtual machines into the first portion of the customer network on the first pod,
- wherein the virtual machines outside the first portion of the virtual machine network operate on one or more secondary system routing appliances in a second portion of the virtual machine network, and wherein determining the measure of network fragmentation includes considering volume of network traffic between the first and second portions of the virtual machine network.

2. A method according to claim 1, further including:
- determining whether resources allocated to the one or more additional virtual machines in a second pod are less than or equal to the available resources in the first pod;
- in response to determining that the allocated resources are less than or equal to the available resources in the first pod, reallocating the migrated virtual machines from the second pod to the first pod by allocating a set of corresponding physical resources in the first pod to the migrated virtual machines; and
- releasing the allocated resources within the second pod.

3. The method of claim 2, wherein allocating the set of corresponding physical resources further comprises a transfer of physical storage data from the second pod to the first pod, and wherein the physical storage data includes one or more disk volumes for the migrated virtual machines.

4. The method of claim 2, wherein allocating the set of corresponding physical resources further comprises memory and processing counters, and further comprising running a migrated virtual machine from a previous processing counter.

5. The method of claim 2, wherein reallocating the migrated virtual machines further comprises routing network traffic for the migrated virtual machines from the second pod to the first pod.

6. The method of claim 1, wherein the first portion of the virtual machine network comprises a primary system routing appliance allocated to the customer.

7. The method of claim 1, wherein the measure of network fragmentation is determined from an allocation of primary and secondary system routing appliances to the virtual machine network.

8. The method of claim 1, wherein the zone comprises the first pod and a plurality of additional pods.

9. The method of claim 1, wherein the first portion of the virtual machine network and the primary routing appliance reside in the first pod, and the second portion of the virtual machine network and the one or more secondary system routing appliances reside in a second pod distinct from the first pod.

10. The method of claim 9, wherein:
- the customer is a first one of a plurality of customers each having a respective customer routing domain to handle network traffic for respective virtual machine networks of the customers;
- a first customer routing domain resides on a first computing server in the first pod and handles traffic for the first customer within the first portion of the virtual machine network of the first customer;
- a second customer routing domain resides on a second computing server in the second pod and handles traffic for a second customer within a virtual machine network of the second customer located within the second pod;
- a phantom routing domain resides on the second computing server for handling traffic in the second portion of the virtual machine network of the first customer and for communicating network traffic between the first customer routing domain and the second portion of the virtual machine network of the first customer.

11. The method of claim 1, wherein the virtual machines outside the first portion of the virtual machine network include a pair of virtual machines and another virtual machine, the pair of virtual machines using local network resources of the second portion of the customer network, and further including selecting the other virtual machine to be migrated based on its use of a greater amount of traffic of the first portion of the customer network than the pair of virtual machines.

12. A non-transitory computer readable storage medium storing instructions executable by a computer system, the instructions when executed cause the computer system to perform a method for defragmenting a virtual machine network of a customer, the virtual machine network comprising a plurality of virtual machines associated with the customer, the virtual machine network spanning one or more pods, wherein each pod comprises a set of physical resources in a zone, the physical resources comprising physical, storage, and network resources, the method including: identifying first virtual machines of the customer in a first pod operating a first portion of the virtual machine network of the customer; identifying additional virtual machines associated with the customer and outside the first portion of the virtual machine network; determining a measure of network fragmentation of the customer network, the measure indicating a degree to which virtual machines of the customer are distributed across multiple pods; determining available resources in the first pod for migrating one or more of the additional virtual machines to the first pod, and whether the measure of network fragmentation indicates an advantage to the customer network by migrating one or more of the additional virtual machines to the first pod to reduce network fragmentation; and based on the available resources and the measure of network fragmentation indicating the advantage to the customer network, migrating one or more of the additional virtual machines into the first portion of the customer network on the first pod, wherein the virtual machines outside the first portion of the virtual machine network operate on one or more secondary system routing appliances in a second portion of the virtual machine network, and wherein determining the measure of network fragmentation includes considering volume of network traffic between the first and second portions of the virtual machine network.

13. A non-transitory computer readable storage medium according to claim 12, wherein the instructions when executed cause the one or more processors to: determine whether resources allocated to the one or more additional virtual machines in a second pod are less than or equal to the available resources in the first pod.

14. The non-transitory computer readable storage medium of claim 13, wherein the instructions to allocate the migrated virtual machines further cause the one or more processors to route network traffic for the migrated virtual machines from the second pod to the first pod.

15. The non-transitory computer readable storage medium of claim 12, wherein the instructions further cause the one or more processors to determine the measure of network fragmentation from an allocation of primary and secondary system routing appliances to the virtual machine network.

16. The non-transitory computer readable storage medium of claim 12, wherein the first portion of the virtual machine network and the primary routing appliance reside in the first pod, and the second portion of the virtual machine network and the one or more secondary system routing appliances reside in a second pod distinct from the first pod.

17. The non-transitory computer readable storage medium of claim 12, wherein: the customer is a first one of a plurality of customers each having a respective customer routing domain to handle network traffic for respective virtual machine networks of the customers; a first customer routing domain resides on a first computing server in the first pod and handles traffic for the first customer within the first portion of the virtual machine network of the first customer; a second customer routing domain resides on a second computing server in the second pod and handles traffic for a second customer within a virtual machine network of the second customer located within the second pod; a phantom routing domain resides on the second computing server for handling traffic in the second portion of the virtual machine network of the first customer and for communicating network traffic between the first customer routing domain and the second portion of the virtual machine network of the first customer.

18. The non-transitory computer readable storage medium of claim 12, wherein the virtual machines outside the first portion of the virtual machine network include a pair of virtual machines and another virtual machine, the pair of virtual machines using local network resources of the second portion of the customer network, and further including selecting the other virtual machine to be migrated based on its use of a greater amount of traffic of the first portion of the customer network than the pair of virtual machines.

* * * * *

UNITED STATES PATENT AND TRADEMARK OFFICE
CERTIFICATE OF CORRECTION

PATENT NO. : 8,874,749 B1
APPLICATION NO. : 13/020802
DATED : October 28, 2014
INVENTOR(S) : Chiradeep Vittal et al.

It is certified that error appears in the above-identified patent and that said Letters Patent is hereby corrected as shown below:

In the Claims

Claim 13, Column 27, should read as follows:

---13. A computer readable storage medium according to claim 14, wherein the instructions when executed cause the one or more processors to:
    determine whether resources allocated to the one or more additional virtual machines in a second pod are less than or equal to the available resources in the first pod;
    reallocate the migrated virtual machines from the second pod to the first pod by allocating a set of corresponding physical resources in the first pod to the migrated virtual machines; and
    release the allocated resources within the second pod.---

Signed and Sealed this
Twenty-first Day of March, 2017

Michelle K. Lee
*Director of the United States Patent and Trademark Office*